US006331223B1

(12) United States Patent
Wylie et al.

(10) Patent No.: US 6,331,223 B1
(45) Date of Patent: Dec. 18, 2001

(54) METHOD OF FABRICATING ADHESIVELY SECURED FRAME ASSEMBLY

(75) Inventors: Douglas H. Wylie, Waterdown; John Szabo, Pickering; Saj Ravindran, Toronto, all of (CA)

(73) Assignee: Saint-Gobain Bayform America, Inc., Cadiz, OH (US)

( * ) Notice: Subject to any disclaimer, the term of this patent is extended or adjusted under 35 U.S.C. 154(b) by 0 days.

(21) Appl. No.: 09/379,102

(22) Filed: Aug. 23, 1999

Related U.S. Application Data

(63) Continuation of application No. 08/997,737, filed on Dec. 24, 1997, now Pat. No. 6,279,644.

(51) Int. Cl.[7] .............................. B32B 31/00; E06B 9/00

(52) U.S. Cl. .......................... 156/160; 156/229; 160/371; 160/378

(58) Field of Search .................................... 156/160, 229; 209/403, 405; 101/127.1; 160/378, 371

(56) References Cited

U.S. PATENT DOCUMENTS

| | | | |
|---|---|---|---|
| 1,058,616 | | 4/1913 | Maze . |
| 2,791,264 | | 5/1957 | Couse . |
| 3,255,810 | * | 6/1966 | Rowbottam ...................... 156/160 X |
| 3,296,056 | | 1/1967 | Bechtold . |
| 3,373,545 | | 3/1968 | Setnan . |
| 3,455,367 | * | 7/1969 | Le Tarte . |
| 3,542,619 | | 11/1970 | McManus . |
| 3,756,881 | | 9/1973 | Denman . |
| 3,760,860 | * | 9/1973 | Kelarakis ............................ 160/179 |
| 3,871,153 | | 3/1975 | Birum, Jr. . |

(List continued on next page.)

FOREIGN PATENT DOCUMENTS

| | | | |
|---|---|---|---|
| 1157765 | | 11/1963 | (DE) . |
| 3446792 A1 | | 12/1984 | (DE) . |
| 29701908U1 | | 2/1997 | (DE) . |
| 0073319 | * | 3/1983 | (EP) . |
| 0 356 209 A2 | | 2/1990 | (EP) . |

(List continued on next page.)

OTHER PUBLICATIONS

International Search Report dated Apr. 27, 2001.

PCT Written Opinion dated Aug. 17, 2001.

*Primary Examiner*—Jeff H. Aftergut
(74) *Attorney, Agent, or Firm*—Duane Morris & Heckscher LLP; Steven E. Koffs

(57) ABSTRACT

A frame includes a plurality of screen bar segments. To form the screen bar, a flat malleable strip is provided. The strip is roll-formed to form a tube having a tensioning step on its face. The tensioning step extends along a length of the tube. The tensioning step has a mounting surface, which may be the bottom of the tensioning step. A hot-melt adhesive is applied to the mounting surface. The screen is spread across the frame, so that the screen extends over the mounting surface of each screen bar segment. The screen is secured to the face of the frame with an adhesive at a plurality of positions across a length of the mounting surface of at least one screen bar segment. The adhesive may be a hot melt adhesive. The screen is inserted with a plurality of pins to intermittently suspend the screen in the adhesive across the length of the screen bar segment. An apparatus for securing the screen to the screen bar segment includes a support surface that holds a screen bar segment. A heat source applies heat directly to the adhesive to melt the adhesive on the screen bar segment. The apparatus is capable of actuating the pins to cause the screen to contact the adhesive. The pins may embed the screen deeply enough to contact the mounting surface beneath the pins, while the screen is intermittently suspended in the adhesive between pins.

52 Claims, 17 Drawing Sheets

U.S. PATENT DOCUMENTS

| | | | | |
|---|---|---|---|---|
| 4,161,977 | | 7/1979 | Baslow . | |
| 4,183,986 | | 1/1980 | Blaetterlein . | |
| 4,189,880 | | 2/1980 | Ballin . | |
| 4,197,686 | | 4/1980 | Baslow . | |
| 4,248,657 | | 2/1981 | Henry . | |
| 4,568,455 | | 2/1986 | Huber et al. . | |
| 4,635,418 | | 1/1987 | Hobgood . | |
| 4,675,065 | | 6/1987 | Gordon . | |
| 4,684,425 | | 8/1987 | Bannister . | |
| 4,741,797 | | 5/1988 | Henderson et al. . | |
| 4,851,070 | | 7/1989 | Shimada . | |
| 4,949,518 | | 8/1990 | Nagel et al. . | |
| 4,968,366 | * | 11/1990 | Hukki et al. | 156/160 X |
| 4,981,075 | * | 1/1991 | Christman | 101/127.1 |
| 5,032,210 | | 7/1991 | Hukki et al. . | |
| 5,039,246 | | 8/1991 | Woodruff et al. . | |
| 5,090,469 | | 2/1992 | Boulanger . | |
| 5,137,622 | | 8/1992 | Souter . | |
| 5,238,515 | | 8/1993 | Insalaco et al. . | |
| 5,258,083 | | 11/1993 | Monk et al. . | |
| 5,407,522 | | 4/1995 | Insalaco et al. . | |
| 5,615,776 | | 4/1997 | Björklund et al. . | |
| 5,662,383 | | 9/1997 | Hand . | |
| 5,666,773 | | 9/1997 | Librande et al. . | |
| 5,676,052 | | 10/1997 | Wegrzyn et al. . | |
| 5,689,924 | | 11/1997 | Mason . | |
| 5,715,638 | | 2/1998 | Anderson, Sr. . | |
| 5,718,791 | | 2/1998 | Spengler . | |
| 5,775,400 | | 7/1998 | Wilkinson . | |
| 5,783,137 | | 7/1998 | Alives Porta . | |
| 5,787,657 | | 8/1998 | Librande et al. . | |
| 5,794,328 | | 8/1998 | Simone . | |
| 5,794,528 | | 8/1998 | Gronig et al. . | |
| 5,797,223 | | 8/1998 | Shoup et al. . | |
| 5,806,549 | | 9/1998 | Love . | |
| 5,816,279 | | 10/1998 | Zheng . | |
| 5,816,954 | | 10/1998 | Zheng . | |
| 5,819,651 | | 10/1998 | Zepic et al. . | |

FOREIGN PATENT DOCUMENTS

| | | |
|---|---|---|
| 2630037 | 10/1989 | (FR) . |
| 711429 | 6/1954 | (GB) . |
| 63 137 828 | 6/1988 | (JP) . |
| 04 166 590 | 6/1992 | (JP) . |
| 04 306 392 | 10/1992 | (JP) . |

* cited by examiner

METHOD OF FABRICATING ADHESIVELY SECURED FRAME ASSEMBLY

This application is a continuation-in-part of U.S. patent application Ser. No. 08/997,737 filed Dec. 24, 1997, now U.S. Patent No. 6,279,644.

FIELD OF THE INVENTION

The present invention relates to a screen and frame assembly for windows, doors and the like, and methods and apparatus for fabricating such frame assemblies.

DESCRIPTION OF THE RELATED ART

The general purpose of screens is to prevent the ingress of insects, while providing ventilation. A typical screen assembly is made up of screen cloth, fabric, or mesh attached to a screen frame in a manner discussed in more detail below. For brevity, the term "screen" is used herein, and includes such screen cloth, fabric, mesh or similar ventilation material.

Screen frames for windows, doors, operable skylights and the like are commonly made of four elongated frame members, called screen bars, of uniform cross section. These bars are typically roll-formed from aluminum or sheet steel, although some may be extruded aluminum. (Plastic and wood are also used, but to a lesser extent.) These screen bars are supplied from the screen bar manufacturer in lineal form and are cut to a final length by the screen assembly manufacturer. Further, these screen bars are held together at the comers with plastic or metal inserts, called corner keys, to form the screen frame.

Different style corner keys are available and are designed to match the particular screen bar used. The most popular corner key allows the screen bar to be cut straight at 90° at the ends. These keys typically are made from injection molded plastic and have a square block body to visibly fill the corner area of the frame. Attached to the body are insertion prongs that are pushed into the hollow screen bar profile to create friction fit connections. Corner keys requiring a 45° miter cut on the ends of the screen bar also can be used. These keys, usually metal, are less expensive and entirely hidden inside the screen bar. These keys also provide a friction fit connection.

Screen is then affixed to the screen frame, in a manner discussed below, to form a screen and frame assembly. These assemblies are then removably secured to windows, doors (e.g., patio screen doors), operable skylights, and the like. Screen and frame assemblies for such openings are very similar, often differing only in size. Accordingly, for brevity, screen and frame assemblies for windows are described herein. Nevertheless, it will be understood that this discussion applies equally to screen and frame assemblies for doors, operable skylights and the like.

It is desirable that the screen be a light weight fabric or mesh, and stretched taut across the screen frame to avoid unsightly sag and to allow a viewer to see through the screen with minimal visual interference. However, if the screen is tensioned excessively, the screen bars deform inwardly in an hourglass shape. This resultant shape is not only aesthetically undesirable, but also can prevent proper installation in the window opening. Excess screen tension also increases the risk of tearing the screen during manufacture of the screen and frame assembly or while the assembly is in service.

Typically, the screen is fiberglass yarn or roving, which is coated, for example, with polyvinyl chloride (PVC), woven and heat fused. The next most popular form of screen is made by weaving drawn aluminum wire, which is subsequently painted. The PVC coated fiberglass screen is the most popular type, by approximately a 4 to 1 ratio (in area). However, both offer the desired attributes of suitable strength and an open weave.

To compensate for deformation of the screen frame into the hourglass shape discussed above, generally the screen bars are manufactured with an outward bow, in the plane of the screen, before the screen is installed. After the screen is installed into the screen bar by the manufacturer, its final tension straightens the frame members in the final assembly. This "pre-bow" is set into the screen frame during the extrusion or roll forming process to make the screen bar lineal.

Typically, roll-formed bar has approximately 20 millimeters (0.75 inches) of bow over a 3.7 meter (12 feet) length. Additional bow is usually set by hand into the roll-formed bar prior to screen installation when the length of the frame members is greater than 1 meter (approximately 3.5 feet). Pre-bowing is not generally required, however, when the screen bar is sufficiently rigid to resist deformation caused by the resultant screen tension.

It is the current practice, essentially industry-wide, to secure screen in open grooves formed along inside edges of the screen frames using a stuffer strip known as "spline" and its associated fastening techniques. The open grooves are known as "spline grooves." A spline is often a wire-like, extruded rigid plastic or foam material, although some splines are made from metal, especially for use with aluminum screens. A spline is usually round or T-shaped in cross section, but can be U-shaped, for example.

U.S. Pat. No. 5,039,246 (the '246 patent) shows a conventional method of securing screen to a frame member using a spline. Using the reference numerals of the '246 patent, the spline 58 is forced into a spline groove or recess 56 in the screen bar 20, with the screen 22 sandwiched between the spline 58 and the spline groove 56.

The screen 22 is held by friction between the spline 58 and the spline groove 56 with the resulting interference fit. A lip 50 and a ledge 52, part way down one side of the groove wall, are typically included to help trap and improve the strength in retaining the screen 22. The spline 58 and trapped screen 22 are forced into the groove 56, usually by hand, with the use of a roller device 70, including a roller 72. The term, "hand wiring", is used to describe the action of securing the screen 22 with the spline 58 into the spline groove 56. Many attempts have been made to automate the installation of spline by machine. However, this automation has proven to be very difficult and machines of this nature have not been widely accepted as a viable option to hand wiring.

The conventional procedure for manufacturing and hand wiring a screen and frame assembly is discussed in more detail below. Firs, the screen bars are cut to length:, accounting for the corner key dimensions. Then, the screen frame is assembled using the cut screen bars and corner keys. As discussed above, when light construction screen bars are used, as is normally the case, a balance between pre-bow tension and screen tension is necessary to ensure straight screen bars and desirable tension in the final assembly. When the screen bar has insufficient pre-bow tension, the bars are deformed by hand a sufficient degree after the corner keys have been inserted. As discussed above, the amount of pre-bow is determined based on experience, but is typically a few millimeters of bow per meter length of the screen bar.

The screen frame is then secured to a table using locator (stop) blocks, which prevent shifting and maintain the frame square during screen installation. The table typically has permanent stop blocks for orienting the screen frame. To avoid hourglassing, removable blocks are located on the inside of the frame segment to limit deflection of the screen bar by the screen tension on assembly. (The spline groove must be facing up and unobstructed by the blocks.) More elaborate tables use removable blocks arranged in grooves cut into the table, with the removable blocks being secured by integral friction clamps.

After the screen frame is secured to the table, the screen is pulled from a roll and positioned to cover the opening formed by the frame. Ideally, no excess screen is used, but this is difficult to achieve in practice. As a result, most manufacturers cut the screen approximately two inches wider than the frame width, so that the screen is pulled past the end of the frame by approximately one inch to ensure that sufficient amount of screen can be rolled into the spline groove along the frame perimeter. In either technique, the screen is positioned over, with edges parallel to, the secured screen frame.

The screen and spline are installed into the spline groove by starting in one of the frame corners. The screen is then stretched taut at the next corner with one hand, keeping it straight and parallel to the edge of the mating screen bar. The spline is simultaneously held above the groove in the same manner as the screen, with the same hand. With the other hand, the installation roller is pushed along towards the upcoming corner with a firm downward force to push the spline and trap the screen into the spline groove. This action is repeated on the second and third screen bars. On the last screen bar, most of the tension is set into the screen. On this leg, the screen is pushed into the screen bar with the installer's finger, just prior to the insertion of the spline. This pre-insertion technique reduces the final tension in the screen to the desired level. The spline is cut at the final corner with a utility knife.

After the spline and screen are inserted in all screen bars, excess screen around the edge of the frame is cut away with a utility knife. To do this, the point of the blade is pushed against the screen bar, through the screen, immediately adjacent to the spline groove around the outside edge of the screen bar. Care must be taken to cut the screen close to the spline groove without cutting the screen covering the opening formed by the frame. The finished screen and frame assembly is removed from the table, inspected, and any necessary hardware is attached.

The current hand wiring process using spline has several drawbacks, however.

Current standards for screen and frame assemblies are established by associations such as the Screen Manufacturers Association (ANSI-SMA SMT 31–1990) in the United States and the General Standards Board in Canada (CAN-CGSB-79.1–M91). These standards cover particular elements of screen and frame assemblies for windows, patio doors and the like. For example, these standards set forth tolerances in terms of the strength of the screen, the strength required to fasten the screen to the screen bar, the amount of sag in the screen, etc. Although these standards generally can be met by using the spline technology discussed above, very close and consistent dimensional tolerances are required between the spline and the spline groove, respectively, in order to achieve the specified fastening strength. These tolerances require close attention and skill with current screen bar roll-forming and extrusion technology and current spline hand wiring techniques. Any out-of-tolerance spline and screen bar produced costs the manufacturer in wasted time, material and goodwill.

Further, the amount of force required by an installer to secure the screen with the spline in the spline groove may be high enough to cause repetitive strain injury, e.g., carpal tunnel syndrome, to one who routinely performs this job. This is of major importance, since this type of injury is serious and has recently received heightened public awareness. Further, such an injury to an installer is also costly to the manufacturer in terms of compensation and loss of skilled labor.

Also, the hand wiring technique is particularly difficult and time-consuming. Notably, it is difficult to control the wire-like spline material and simultaneously control the screen tension with one hand, while the spline is rolled in with the other hand. This operation requires a high degree of skill and careful attention. This adds to the final manufacturing cost, and, hence, increases the final cost to the consumer. Final product consistency is difficult to maintain.

Quality control also has become an issue with current spline techniques. Specifically, installers have learned ways to make their jobs easier, to the detriment of quality control. This is particularly true when using PVC spline. For example, an installer will stretch the PVC spline just prior to insertion, in order to reduce the diameter of the spline. This, of course, makes it easier to install. However, this also reduces the "pull-out" force or attachment strength of the spline and screen. The result is that the screen can be more easily pulled out from the spline groove, which is undesirable. (This, however, is not an issue with polyethylene spline, which does not stretch in the manner of PVC spline.)

There are other drawbacks associated with conventional spline techniques. In particular, the use of a separate fastening device, such as a spline, requires separate inventory control and associated costs. Screen manufacturers prefer to minimize inventory. Therefore, it is desirable to eliminate the spline as a separate item. Also, the need to have a strong interference fit in securing the spline necessitates stiff walls on the spline groove. Further, the spline technology makes the design of automatic assembly equipment extremely complex.

For the foregoing reasons, a need has arisen to provide a screen and frame assembly that eliminates the requirement of a spline. An additional need has arisen to manufacture screen products more easily.

Some attempts have been made in the art to provide screen and frame assemblies without a traditional spline. For example, in U.S. Pat. No. 3,255,810, a continuous strip of fusible material is fused with the screen material and then inserted into the groove in the frame. In U.S. Pat. No. 4,568,455, the bonding of a screen to a thermoplastic frame is accomplished by resistance heating of the screen using an electrical potential of four volts and a current of approximately, 2,200 amps, which is applied for approximately forty-eight seconds, to fuse the thermoplastic. This method, however, requires external tensioning until the thermoplastic cools and solidifies.

In another aspect, U.S. Pat. No. 4,968,366 teaches a complex method of manufacturing tension screens using an apparatus that includes a screen tensioning frame and a platform positioned adjacent to the tensioned screen. The platform includes heating elements about the periphery of a sheet heater. The heating elements receive a screen frame which can be lifted into contact with the screen in the tensioning frame. The screen cloth is pre-tensioned by an external frame. The screen frame is heated to thermally expand the screen frame. Then the screen cloth is expanded by heating, by an amount substantially equal to the amount of thermal expansion of the screen frame during the step of heating the screen frame. Next, the expanded and pre-tensioned screen cloth is bonded to the heated screen flame. The screen frame is then cooled by blowing air over the screen frame. The heat of the screen cloth is maintained by shielding the bonded screen cloth from the blowing air and heating the bonded screen cloth concurrently, while cooling the screen frame, so that the screen cloth does not cool faster than the screen frame during cooling of the screen frame.

Thus, in the arrangement of U.S. Pat. No. 4,968,366, it is necessary to heat the entire mating surface, while the screen is maintained under high tension, and to match, or compensate for, the different thermal expansions of the frame and screen cloth. This complex technique requires high manufacturing precision, including proper tensioning of the screen and mating of the heating elements and the tensioning frame. Further, this technique is too slow and cumbersome to be considered practical for the manufacture of screen and frame assemblies for windows and the like.

Other techniques, in general, are known to fuse screening material to frames. For example, U.S. Pat. No. 4,675,065 (the '065 patent) shows a method for securing a microsieve to a support member. A laser beam is directed against a point on the upper edge of a well which contains the microsieve to melt fusible material in contact with the laser beam. The laser-melted fusible material travels down the well wall, contacts the edge of the microsieve and solidifies to secure the microsieve. Japanese patent document No. 63-137828 (the '828 document) shows a single step method of ultrasonically welding screening net to the bottom of a small, cylindrical container using resin and a single, vibrating tip, which is identical in size to the container bottom. The exotic techniques for the small parts, as described in the '065 patent and the '828 document, are generally limited to their particular applications.

Accordingly, a need has arisen for a screen and frame assembly for windows, doors and the like in which the screen is secured to the frame quickly, with reduced manual labor.

SUMMARY OF THE INVENTION

A first aspect of the present invention includes a method for securing a screen to a frame. The frame includes a plurality of screen bar segments. Each screen bar segment has a mounting surface on a face of the frame. The screen is spread across the frame, so that the screen extends over the mounting surface of each screen bar segment. The screen is secured to the face of the frame with an adhesive at a plurality of positions across a length of the mounting surface of at least one screen bar segment.

Another aspect of the invention is a method for securing a screen to a screen bar segment. The screen bar segment has a mounting surface on one of its faces. The segment has adhesive on the mounting surface. The screen is spread across the mounting surface of the screen bar segment. The adhesive is melted. The screen is inserted with a plurality of pins to embed the screen in the adhesive across the length of the screen bar segment.

Another aspect of the invention is a method for securing a screen to a frame. The frame includes a plurality of screen bar segments. Each screen bar segment has a mounting surface on its face. Each screen bar segment has adhesive on its mounting surface. The screen is spread across the frame so that the screen extends over the mounting surface of each screen bar segment. The adhesive on at least one of the screen bar segments is melted. The screen is inserted with a plurality of insertion means so that the screen contacts the adhesive across a length of the at least one screen bar segment.

Still another aspect of the invention is a method for securing an open mesh screen to a frame. The frame includes a plurality of screen bar segments. Each screen bar segment has a mounting surface on a face of the frame. The frame is supported so that the frame segment with a predetermined camber is held and pre-stressed approximately straight. The open mesh screen is spread across the frame so that the open mesh screen extends over the mounting surface of each screen bar segment. An adhesive is applied on at least one mounting surface. A portion of the open mesh screen is inserted with an inserting apparatus so that the portion of the open mesh screen contacts the adhesive across a length of the mounting surface. The inserting apparatus may contact the adhesive during the tensioning and inserting step.

An additional aspect of the invention is a frame assembly. The frame includes a plurality of screen bar segments. Each screen bar segment has a mounting surface on its face. Each mounting surface has adhesive on it. A screen is spread across the frame so as to extend over the mounting surface of each screen bar segment. The screen is attached to the frame by (a) melting the adhesive, (b) pushing the screen into the melted adhesive with a plurality of pins along at least one mounting surface, and (c) repeating steps (a) and (b) until the screen is in fixative contact with the adhesive on all of the screen bar segments of the frame.

A further aspect of the invention is a frame assembly comprising a frame that includes a plurality of screen bar segments. Each screen bar segment has a mounting surface on its face. Each mounting surface has adhesive on it. A screen is spread across the frame so as to extend over the mounting surface of each screen bar segment. The screen is attached to the frame by the adhesive, so that the screen is substantially in contact with the mounting surface at a plurality of points and is suspended in the adhesive intermittently between the plurality of points along the mounting surface of at least one of the screen bar segments.

Another aspect of the invention is an apparatus for securing a screen to a screen bar segment. A support surface holds a screen bar segment. The screen bar segment has a mounting surface on at least one face. The mounting surface has an adhesive on it. A heat source applies heat to the adhesive to melt the adhesive. A plurality of pins are capable of being actuated to cause the screen to contact the adhesive.

Yet another aspect of the invention is a screen bar for a screen frame. Screen bar stock is provided having a tensioning step on a face thereof. A hot-melt adhesive is bonded to a bottom surface of the tensioning step. The screen bar stock has a stiffness that is sufficient to maintain tension in a screen. The screen bar stock has a weight per unit length that is substantially less than a weight of an aluminum screen bar suitable for a spline-type screen mount.

Another aspect of the invention is a method of forming a screen bar suitable for a screen frame. A flat malleable strip is provided. The strip is roll-formed to form a tube having a tensioning step on a face thereof. The tensioning step extends along a length of the tube. The tensioning step has a bottom surface. A hot-melt adhesive is applied to the bottom surface.

These and other aspects of the present invention are described below with reference to the drawings and the exemplary embodiments.

OVERVIEW

U.S. patent application Ser. No. 08/997,737 filed Dec. 24, 1997 is incorporated by reference herein in its entirety.

The invention includes a method and apparatus for securing a screen 34 to a frame 30, or to a screen bar segment 30*a* of the frame 30. The invention also includes a frame and screen assembly formed by the method, and a screen bar stock used in the assembly.

Figure 1:
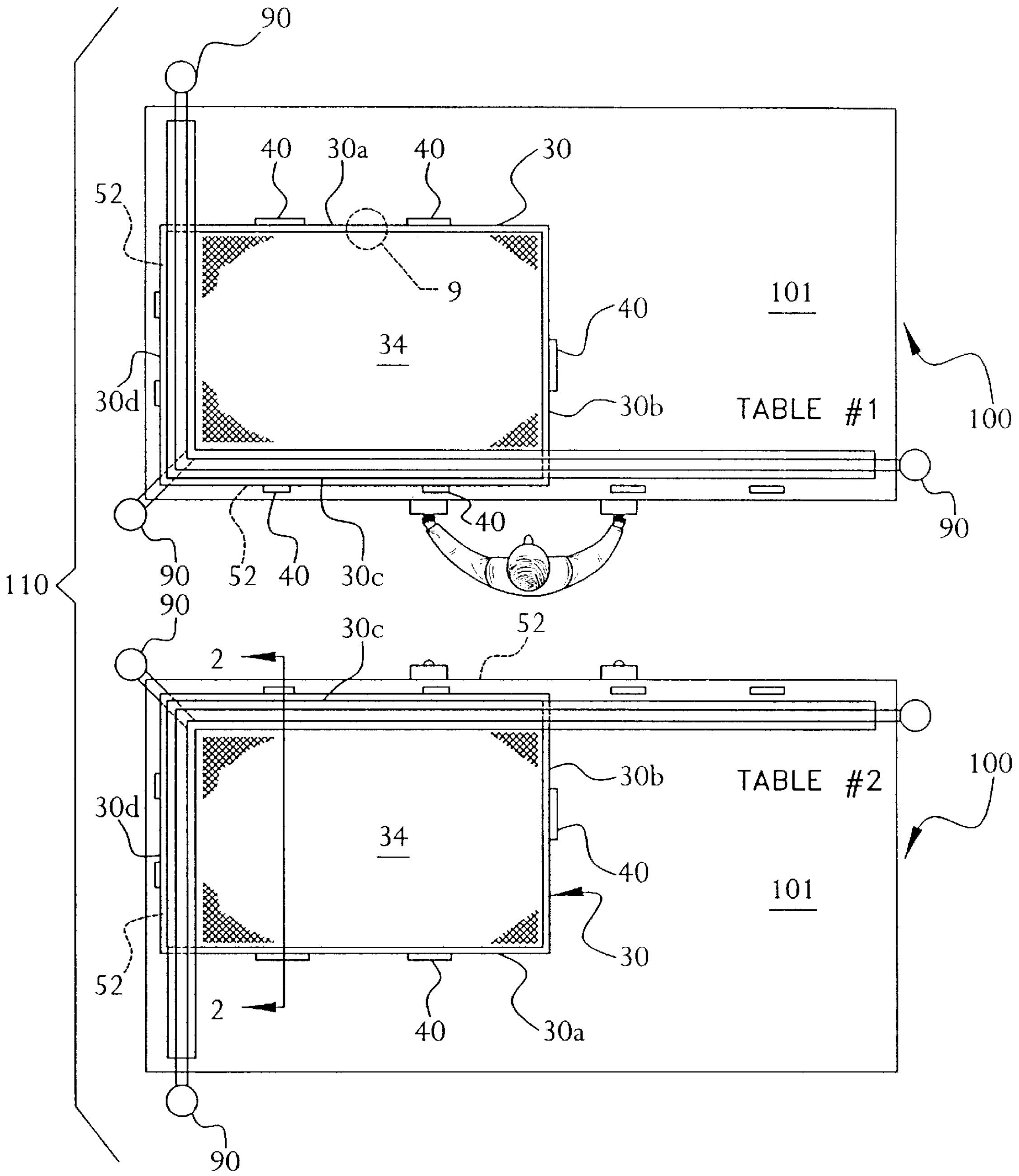
FIG. 1 is a top plan view showing a station including two frame assembly machines according to the present invention.

As shown in FIG. 1, the exemplary frame 30 includes a plurality of screen bar segments 30*a*–30*d*. Each screen bar segment 30*a*–30*d* has a mounting surface 32*a* which may be a bottom of a groove or tensioning step 32 or 32' (best seen in FIGS. 6–11) on a face of the frame 30. The frame 30 may have a flat face, and the mounting surface may be a portion of the flat surface (not shown), but a groove 32 or tensioning step 32' is preferred, because it enhances removal of slack in the screen upon insertion of the pins. The tensioning step 32' has a bottom 32*a*' and at least one side 32*b*' (shown in FIG. 9). Essentially, a groove 32 is a tensioning step that further includes a second side 32*c* (shown in FIG. 7).

These structures and their equivalents are collectively referred to as a "mounting surface" or "tensioning step" herein, for ease of discussion. A mounting surface may be flat or may include a tensioning step. It will be understood that, as used herein the term "tensioning step" encompasses both a tensioning step that is part of a groove, and a step that is not part of a groove. This tensioning step is described in more detail below.

The screen bar segment 30*a* has adhesive 36 at the bottom 32*a* or side 32*b* of the tensioning step 32. The adhesive 36 may be pre-installed in each screen bar segment 30*a*–30*d* before the screen bar segments 30*a*–30*d* are assembled to form the frame 30.

Figure 10:
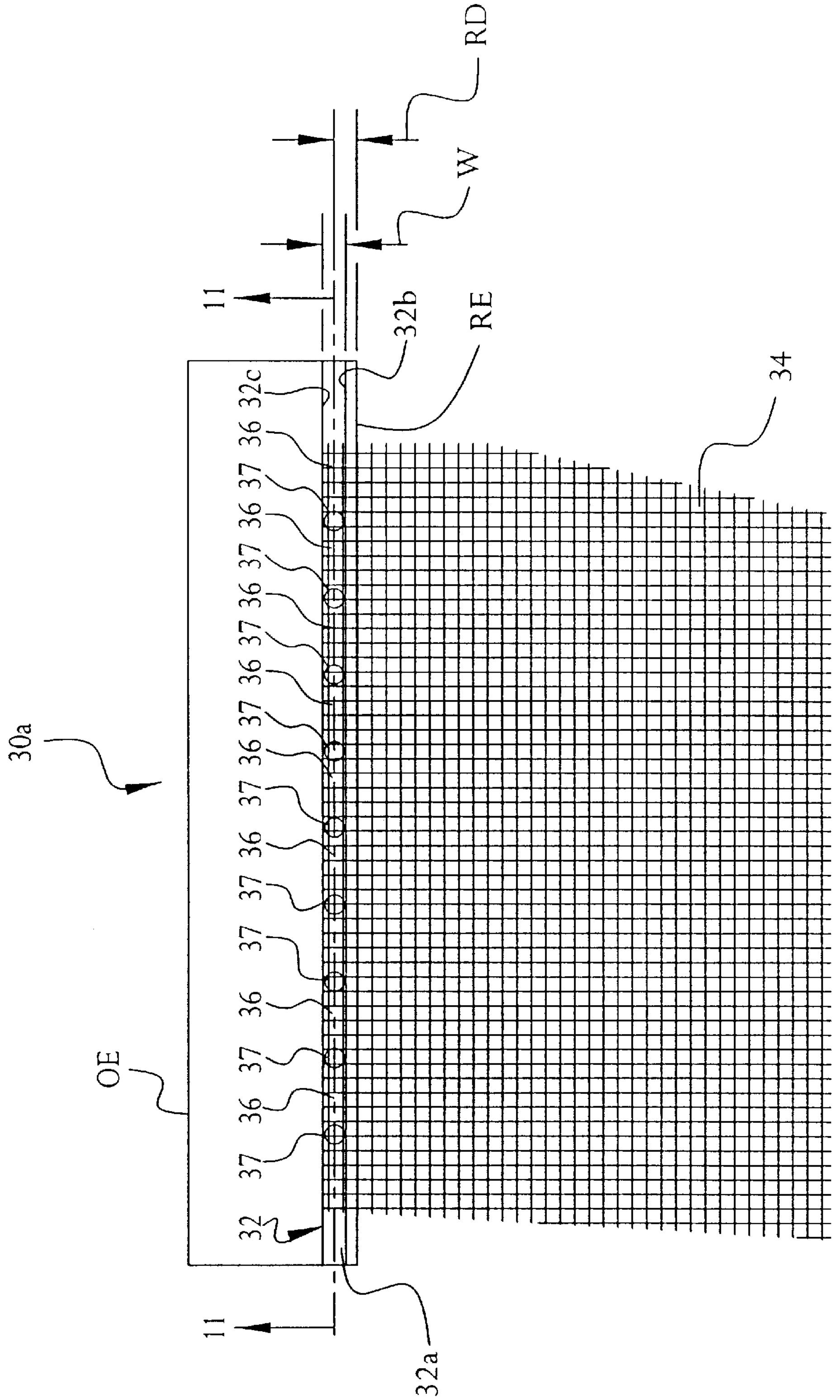
FIG. 10 is an enlarged view of a portion of the screen assembly shown in FIG. 1.

The screen 34 is spread across the frame 30, so that the screen 34 extends over the mounting surface (tensioning step 32) of each screen bar segment 30*a*–30*d* (FIG. 10). The screen 34 is secured to the face of the frame 30 with an adhesive 36 at a plurality of positions 37 across a length of the tensioning step 32 of at least one of the screen bar segments 30*a*–30*d*.

Figure 3:
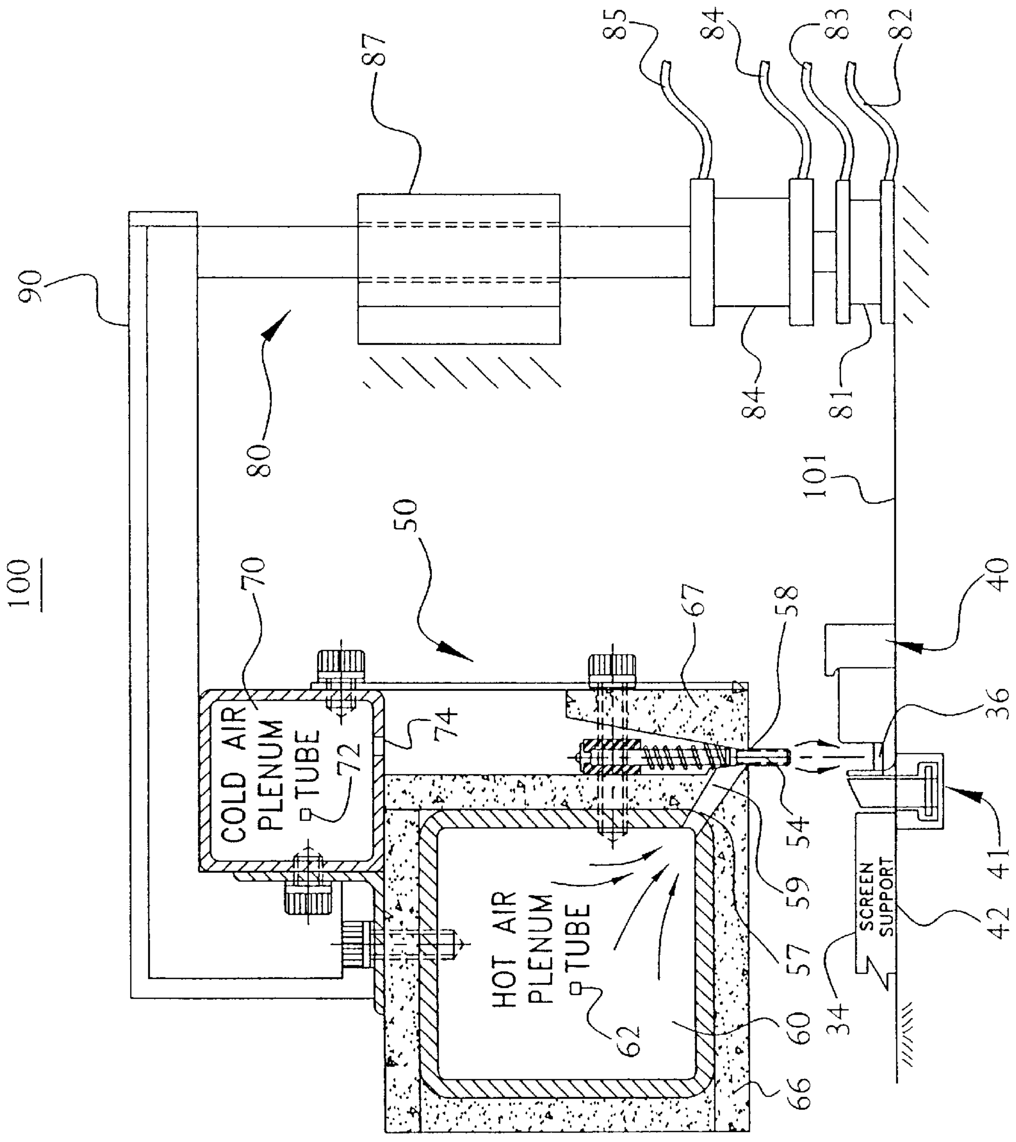
FIG. 3 is a side elevation view of the machine of FIG. 2, in a position for heating the adhesive in the frame bar segment.
Figure 11:
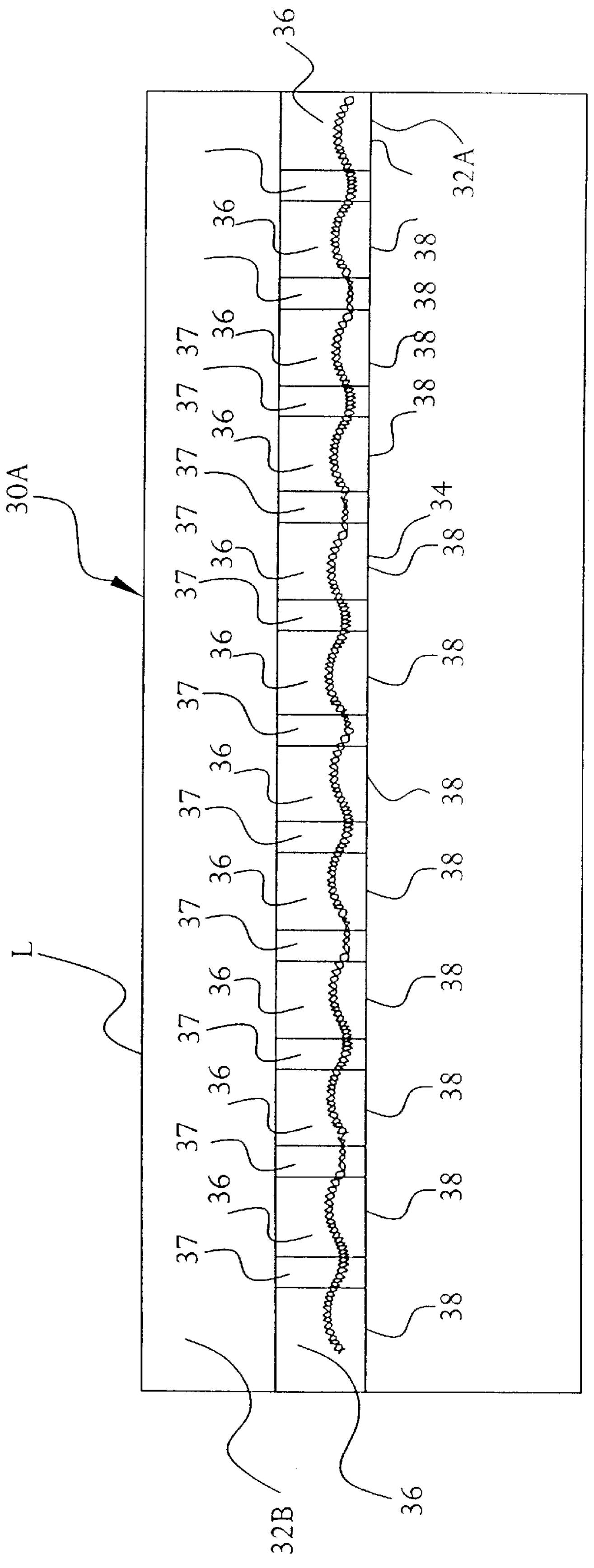
FIG. 11 is a cross sectional view of the screen bar segment shown in FIG. 10, taken along section line 11—11 of FIG. 10.

Preferably, forced convection with a heated gas having a temperature above the melting point of the adhesive is used to heat the adhesive. For example, the heated gas may be air heated to about 175° C., blown directly onto the adhesive 36 (as shown in FIG. 3) to melt the adhesive. The screen 34 is inserted with an inserting apparatus 52, which may include a plurality of pins 54. Pins 54 embed or suspend the screen 34 in the adhesive 36 intermittently across a length of the screen bar segment 30*a*, until portions of the screen beneath the pins 54 are inserted in and possibly contact the bottom 32*a* of the mounting surface (as shown in FIG. 11). The pins 54 of the inserting apparatus 52 contact the adhesive 36 during the inserting step. Natural or forced convection may be used in combination with conduction to cool the adhesive 36. If convection is used, a cool gas having a temperature below the melting temperature of the adhesive 36 is provided. The cool gas may be ambient temperature air, and is blown onto the adhesive 36, or onto the frame, near the adhesive. Preferably, the plurality of pins are removed after allowing the adhesive to cool below the melting point of the adhesive.

The adhesive may be a hot melt adhesive or a thermoplastic resin having a heat resistance temperature of at least about 35° C., preferably between about 100° C. and about 130° C., and a viscosity that is preferably below 5400 poise at about 200° C. For example, the adhesive may be a hot melt adhesive such as polyester, polyamide, polyolefin, polypropylene, polyurethane, butyl or ethylene vinyl acetate based adhesives.

Referring again to FIGS. 1–5, the apparatus 100 for securing the screen 34 to a screen bar segment 30*a* includes a support surface 101 that holds the screen bar segment. One or more pre-loading blocks 40 (FIGS. 1–5) are provided to hold a pre-bowed frame 30 against the support surface 101, so that the frame 30 is distorted to a desired camber while the screen 34 is secured. The frame 30 may be held substantially straight, or may be given a reverse camber while attaching the screen, if desired. Preferably, the apparatus 100 includes a plurality of pre-loading blocks 40 arranged outside of the frame to engage all of the screen bar segments 30*a*–30*d* of the frame 30 simultaneously. A heat source applies heat directly to the adhesive 36 to melt the adhesive. The heat source may include a plurality of nozzles 58 (shown in FIGS. 2 and 5) that direct a heated gas onto the adhesive 36. The nozzles 58 may be located on a movable body 50. The source of the heated gas may include a hot air plenum 60. In the exemplary embodiment, the plenum 60 may be located on the movable body 50.

According to an aspect of the invention, the pre-loading blocks 40 may be positioned outside of the frame 30, without using any stop-blocks inside the frame. Preferably, the frame 30 is deformed inward elastically (hourglassed) slightly, so that when the frame is removed from the pre-loading blocks 40, the frame returns to a substantially straight configuration, with sufficient movement to remove wrinkles from the screen material 34. (The screen material 34 has a high modulus of elasticity (Young's modulus) relative to the frame members, so that the frame members are held straight by the screen material. A pair of inside (backstop) blocks may be used to limit the amount of movement when the frame is pre-loaded by the pre-loading blocks 40. The amount of this pre-bow or pre-tensioning is sufficiently small so that, when the frame 30 is released from the pre-loading blocks 40, the screen material 34 is substantially wrinkle- free, but has a sufficiently small amount of tension so as not to overly distort the screen bar.

Alternatively, the configuration may include pre-loading blocks 40 on all four sides of the frame, with backstop blocks inside of the frame on only two sides; the inside blocks may be used on the two sides of the frame into which the screen material is currently being embedded in the adhesive. The two sides into which the screen is currently being inserted are held straight, whereas the remaining two sides are allowed to deflect inward towards the center of the frame, so as to have a reverse camber.

The plurality of pins 54 (best seen in FIG. 5) are located on the movable body 50, proximate to the nozzles 58. The plurality of pins 54 may be arranged in a straight line segment. An actuator 84 raises and lowers the body 50 (or the table) so that the pins 54 simultaneously push the screen 34 into the adhesive 36. The pins 54 are capable of being actuated to embed the screen 34 in the adhesive 36. A release coating (e.g., tetrafluoroethylene ("TEFLON") or silicone) may be applied to the plurality of pins 54 before inserting the screen 34 with the pins 54. The plurality of pins 54 may be spring loaded with springs 56 to accommodate corners. Successive pins 54 may be spaced apart from each other by a distance 8 (FIG. 5) of between about 0.6 centimeters (cm) and about 2.5 cm. Preferably, the distance 8 between pins is about 1.25 cm.

Figure 4:
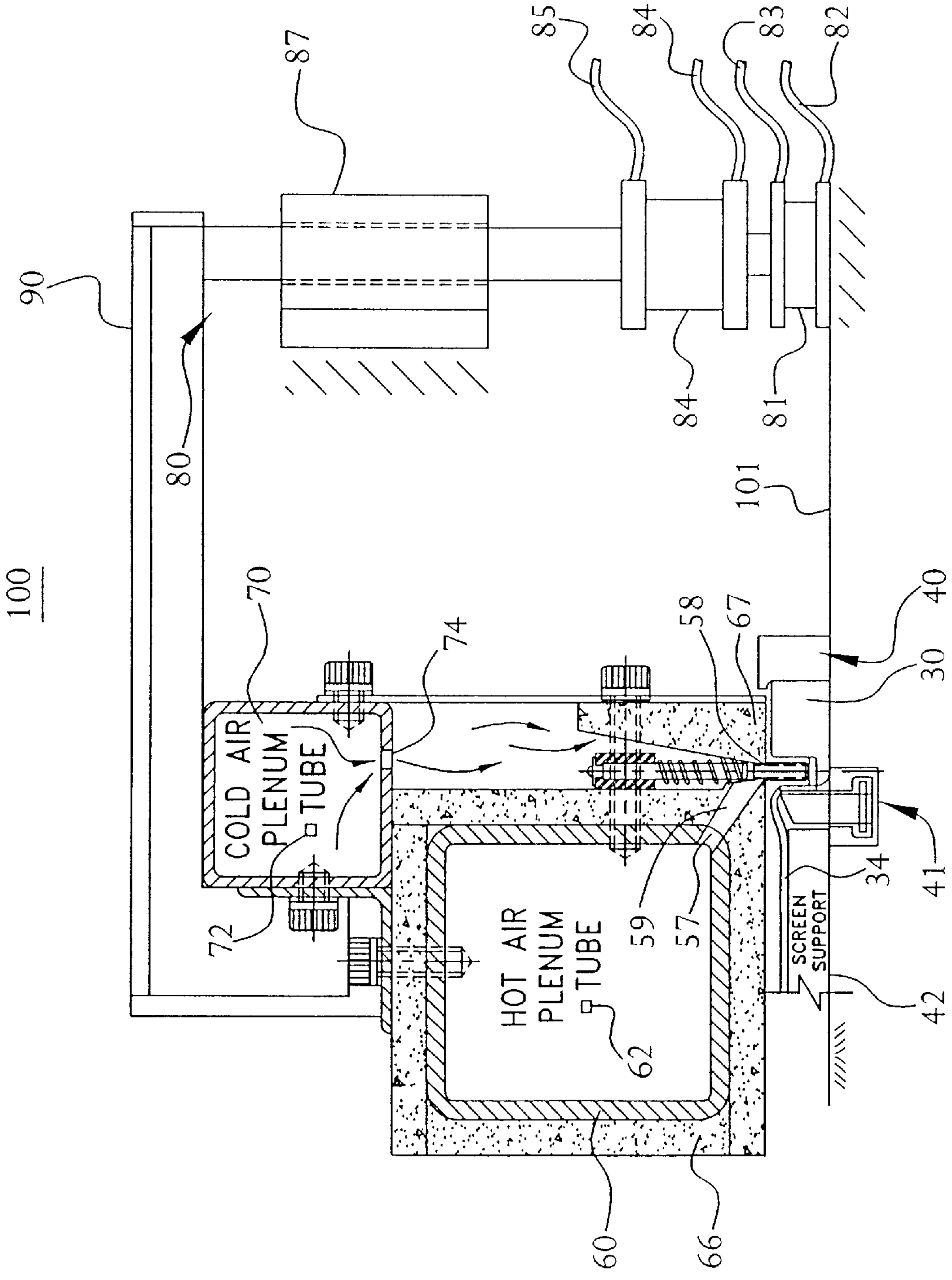
FIG. 4 is a side elevation view of the machine of FIG. 2, in a position for inserting the screen and cooling the adhesive in the frame bar segment.

As shown in FIG. 4, the nozzles 58 may also be configured to direct a cool gas directly onto the adhesive 36 when the nozzles 58 are connected to the source of the cool gas. The source of the cool gas may be plenum 70 and may contain ambient air. In the example shown, the nozzles 58 are connectable to either the source of heated gas (hot air plenum 60) or a source of a cool gas (cold air plenum 70).

The pins 54 may have a diameter P (FIG. 5) that is less than a width W (FIG. 10) of the groove 32 of the screen bar segment 30*a* by between about 0.05 centimeter and about 0.1 centimeter. For example, the tensioning step may be a groove 32 having a width W of about 0.35 centimeter. A preferred set of pins 54 corresponding to this width have a diameter between about 0.15 centimeter and about 0.34 centimeter, preferably between about 0.25 centimeter and about 0.3 centimeter.

Figure 5:
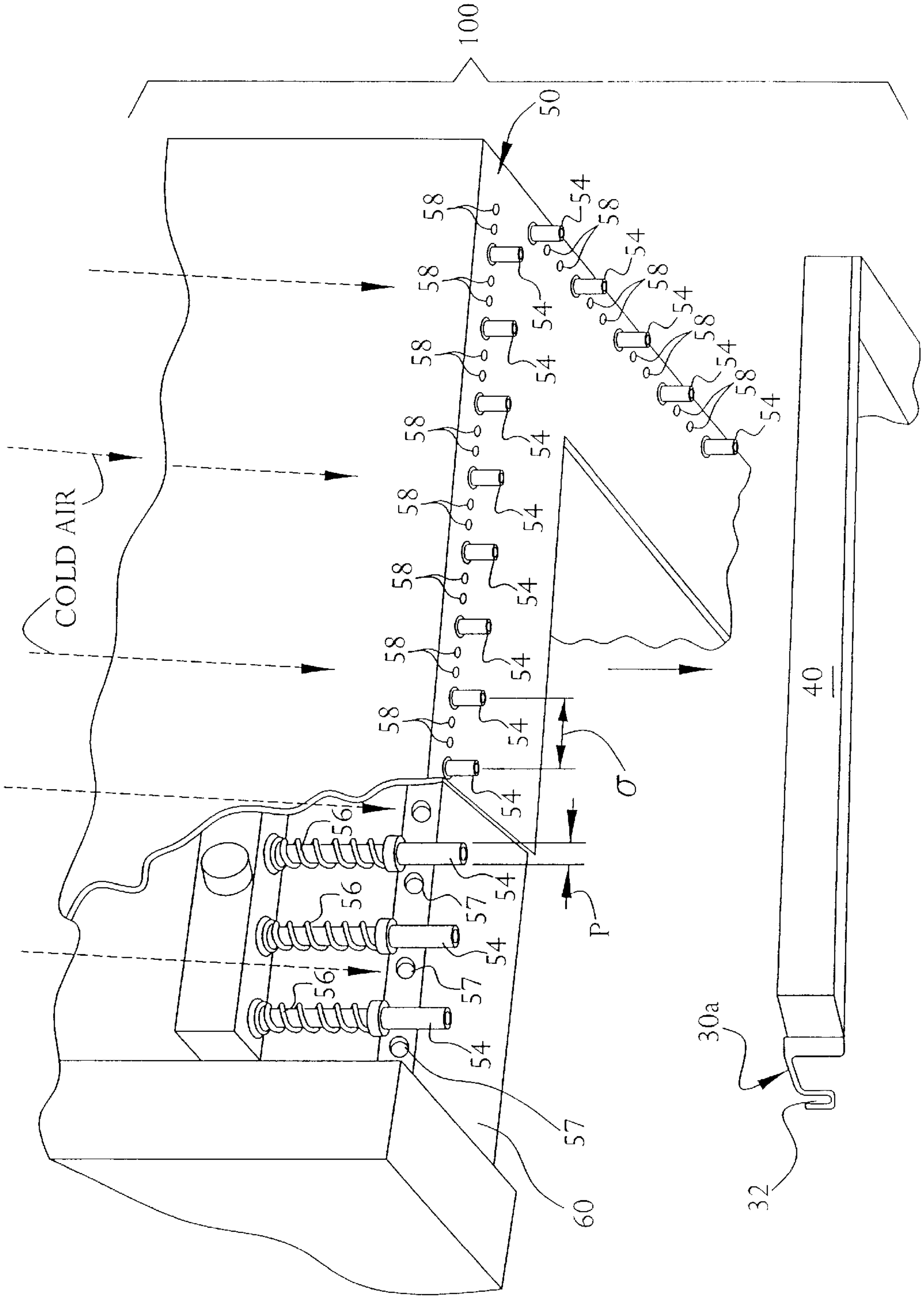
FIG. 5 is an enlarged, partial cutaway perspective view (with the insulation partially removed) of the nozzle section of the machine shown in FIG. 1.

The pins 54 may be arranged to simultaneously insert the fabric into the adhesive on any non-zero number of sides of the frame. Preferably, the fabric is attached to two of the sides at a time. As shown in FIG. 5, in an exemplary embodiment of the apparatus, the plurality of pins 54 include a row and a column of pins aligned in an angle-shaped configuration, for inserting the screen 34 into the adhesive 36 on two screen bar segments 30*a* and 30*b* of the frame 30, simultaneously. The angle may be a right angle as shown in FIG. 5, or another angle for a non-rectangular window. Once the screen 34 is attached to two adjacent sides, the frame is rotated by 180 degrees, and the heating, inserting and cooling steps are repeated to insert the screen 34 into the tensioning steps 32 on a third screen bar segment 30*c* and a fourth screen bar segment 30*d* of the frame 30 simultaneously.

More generally, for any window having an even number of equal sides 2N (where N is an integer greater than one), the pins may be arranged to insert the screen in two of the sides simultaneously. The window can be rotated N-1 times by (360/N) degrees per rotation, to complete installation of the screen 34 in N inserting steps.

Although the apparatus could include pins for all four sides of the frame, such an arrangement would be limited to a specific size of frame (unless at least two of the sides of the apparatus are adjustable, which complicates the apparatus). By including pins on only two sides, a single machine can accommodate a variety of sizes easily, without adjustment. Other arrangements are also contemplated, as described below.

DETAILED DESCRIPTION

Figure 6:
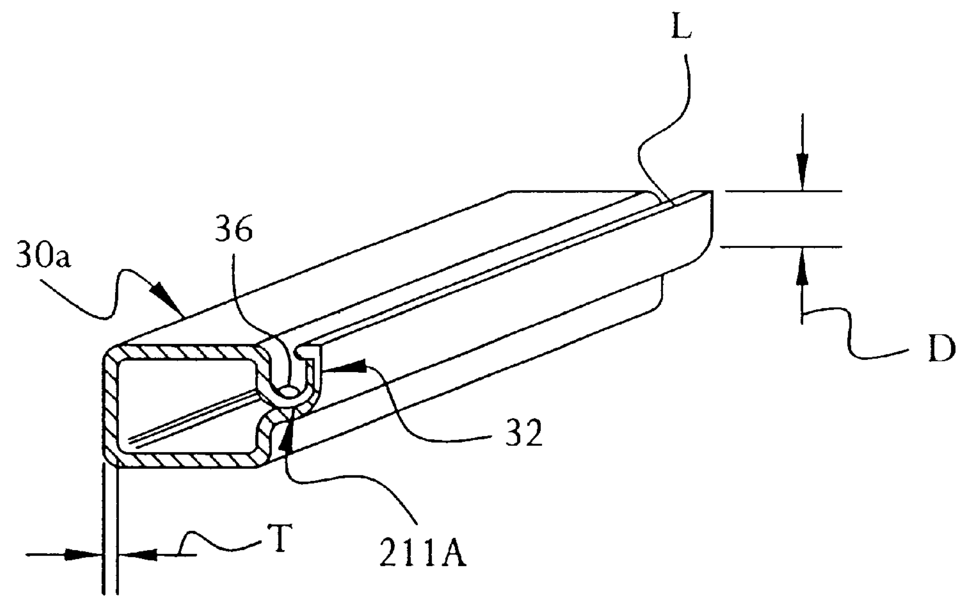
FIG. 6 is an isometric view of a first exemplary screen bar segment suitable for assembly in the machine shown in FIG. 1.
Figure 7:
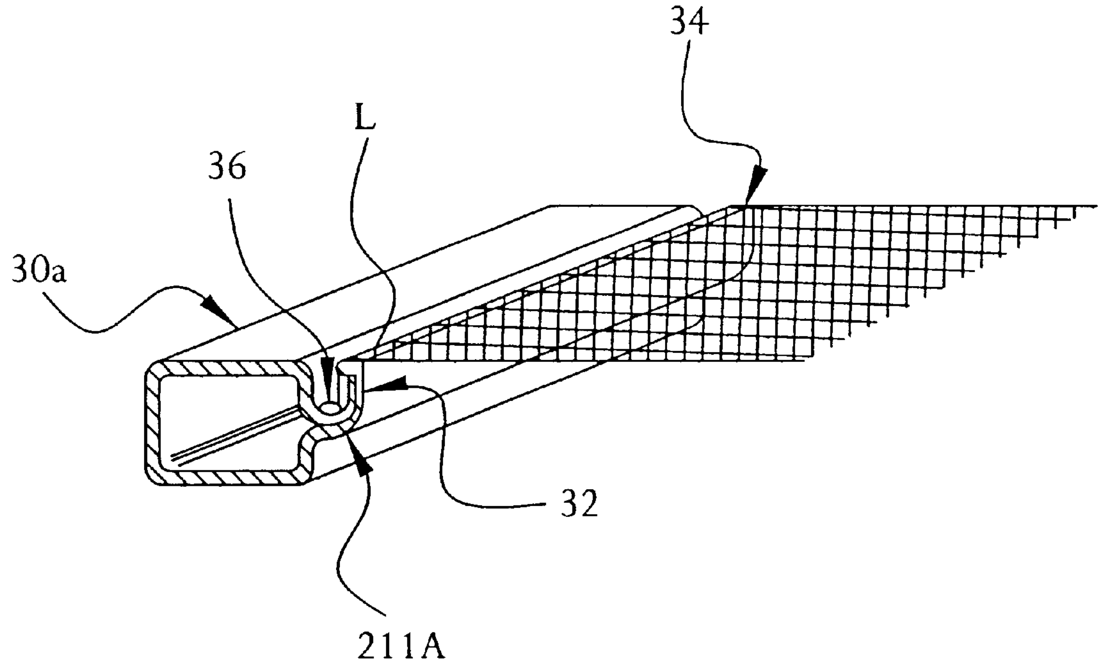
FIG. 7 is an isometric view of the screen bar segment of FIG. 6, with a portion of screen material attached thereto.

FIGS. 6–11 show a segment of a first type of screen bar 30*a* for use in forming a screen and frame assembly. FIG. 6 is an isometric view of the screen bar segment 30*a* before assembly. FIG. 7 is an isometric view of the screen bar segment of FIG. 6, with a portion of screen material 34 attached thereto.

FIG. 10 is a top plan view of the screen bar segment 30*a* and screen material 34 shown in FIG. 7. In FIG. 10, the segment of screen bar 30*a* includes a tensioning step provided by the bottom 32*a* and one side 32*b* of a groove 32. Adhesive 36 is applied along the base 32*a* of the tensioning step, in the groove 32 of the screen bar 30*a*. Therefore, as shown in FIG. 10, the adhesive is secured to the screen bar 30*a* at the base 32*a* of the groove 32. Also shown in FIG. 10 are a plurality of indentations 37 formed in the adhesive 36 by the insertion pins 54, while embedding the screen material 34 into the adhesive.

FIG. 11 is a cross sectional view taken along section line 11–11 of FIG. 10. FIG. 11 is not to scale; vertical dimensions are exaggerated to show features of the exemplary assembly. In particular, the screen material 34 may be pushed substantially all of the way to the bottom 32*a* of the groove 32 by pins 54, forming indentations or openings 37 in the adhesive bead 36 or film, so that the screen substantially contacts the bottom 32*a* (i.e., not more than a microscopically thin film is interposed between the screen material and the bottom of the groove beneath the indentations.) In between the indentations 37, the screen material 34 is intermittently suspended slightly above a thin layer of adhesive. Thus, the screen material 34 acts to strengthen and reinforce the adhesive 36 in the regions between the indentations 37. The resulting structure is very strong.

Optionally, the mounting surface 32*a* of the tensioning step 32 may have a plurality of features 38. The features 38 may be dimples, indentations, holes, slots, striations, or the like. The features 38 are intended to provide a better mechanical bonding surface for the adhesive 36.

Figure 8:
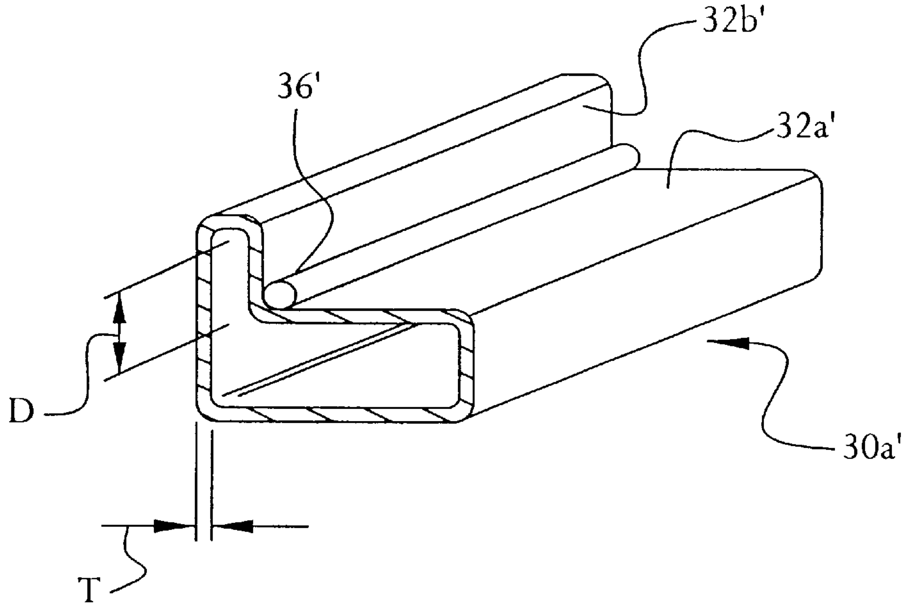
FIG. 8 is an isometric view of a second exemplary screen bar segment suitable for assembly in the machine shown in FIG. 1.
Figure 9:
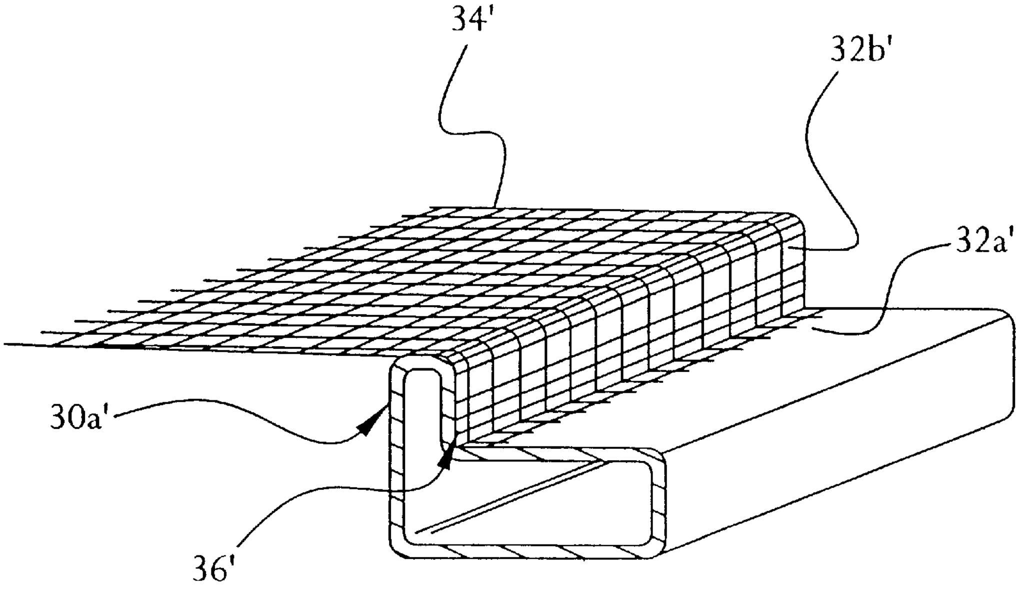
FIG. 9 is an isometric view of the screen bar segment of FIG. 8, with a portion of screen material attached thereto.

FIG. 8 shows a cross-sectional view of a segment of a second type of screen bar 30*a*' for use in forming a screen and frame assembly in which screen can be adhesively secured to the screen bar. FIG. 8 shows that the segment of screen bar 30*a*' includes a step, lip or wall (hereafter, called a "step") 32' along one side thereof. Adhesive 36' applied along the base of the step 32' of the screen bar 30*a*'. In this embodiment, since the base of the step 32' has a relatively sharp angle, the adhesive may be applied against the base of the step 32'.

Therefore, as shown in FIG. 8, the adhesive 36' is secured to the screen bar 30*a*' along and adjacent to the step 32'.

In the embodiments shown in FIG. 6 or 8, a tensioning step can be provided by a conventional spline groove or the like, or by a step, lip, or wall, for example, as desired. A groove (FIGS. 6, 7, 10 and 11) is preferred over a step (FIGS. 8 and 9), lip or wall that is not a groove, because the groove allows the homeowner to install a replacement spline to replace the screen, if necessary, and may be more aesthetically pleasing (The adhesive and the edge of the screen can be hidden from view.) A groove 32 also protects the adhesive bond area from weather and ultraviolet radiation from the sun, to some degree. Also, if a groove is not used, greater pre-tensioning of the screen material may be necessary to achieve tension in the screen fabric 34.

Systems according to the present invention use adhesive 36 in the groove 32 or tensioning step of the screen bar 30*a* (or at the bottom of a tensioning step 32', shown in FIGS. 8 and 9) to secure the screen 34 to the screenbar 30*a* . The present invention solves problems associated with automated installation of screen material 34 on a frame 30. It is a tremendous improvement over manual techniques for attaching a frame using adhesives, and over the current spline technology for at least the following reasons:

1) The invention eliminates the need for manually inserting the screen in the frame.

This elimination results in:

No repetitive strain injury—specifically, a worker is not likely to suffer carpal tunnel syndrome as a result of practicing an assembly technique according to the invention.

Much less effort (physical strength) is required to install screen material using the invention. There is less difficulty and manual work to manufacture screen assemblies.

Little or no skill is required to operate the assembly equipment.

Screen-to-frame retention (bond strength) fabricated by a method according to the invention is three to four times stronger than bonds fabricated using spline technology. Frame and screen assemblies fabricated using apparatus and methods according to the present invention consistently exceed the current standards for pull out strength, whereas spline technology marginally meets these standards.

The strength of the fastening is not dependent upon the gauge of the screen bar metal (as is the case with spline technology), thus allowing reduced metal gauge without loss of retention strength performance Reduced part cost The invention provides a two to three-fold increase in assembly throughput, reducing overall cost significantly.

An apparatus according to the invention can provide low cost, using simple, low-tech machinery. It is far simpler and far better than any automated screen assembly machine currently available commercially.

No post-assembly trimming of the screen cloth is required.

Can use existing screen bar profiles, connectors, fastening hardware.

A frame-screen assembly fabricated according to the invention still allows screen replacement using traditional spline technology by the homeowner.

Improved consistency of tensioning over manual methods and control of quality independent of the skill of the operator.

Referring again to FIGS. 1 and 2, an exemplary work station 110 including two frame-screen assembly systems 100 is shown. Each machine 100 includes a movable block or body 50 which includes heating, inserting and cooling apparatus 52. The exemplary body 50 has a plurality of spring-loaded pins 54, an insulated hot air plenum 60, a cold air plenum 70, and a plurality of common slot nozzles 58 for heating and cooling. Insulation 66 on the hot air plenum provides a uniform temperature distribution across the plurality of nozzles 58 throughout the heating, inserting and cooling apparatus 52. The hot air plenum 60 receives the hot air supply via a tube 62, and the cold air plenum 60 receives the cold air supply via a tube 72.

The plenums 60 and 70 are vessels or containers for gas. The plenums 60 and 70 may be pressurized. Although the drawings show plenums 60 and 70 as being parallelepipeds (boxes), any convenient shape may be used.

Although the exemplary apparatus 52 includes a plurality of nozzles 58 (FIG. 5), one of ordinary skill recognizes that a single elongated nozzle (not shown) extending along the length of the body 52 may be used. Alternatively, a plurality of elongated nozzles (not shown) may extend along the length of the body 52. Hereinafter, reference is only made to a plurality of nozzles, but the description below also applies to single nozzle configurations.

Figure 2:
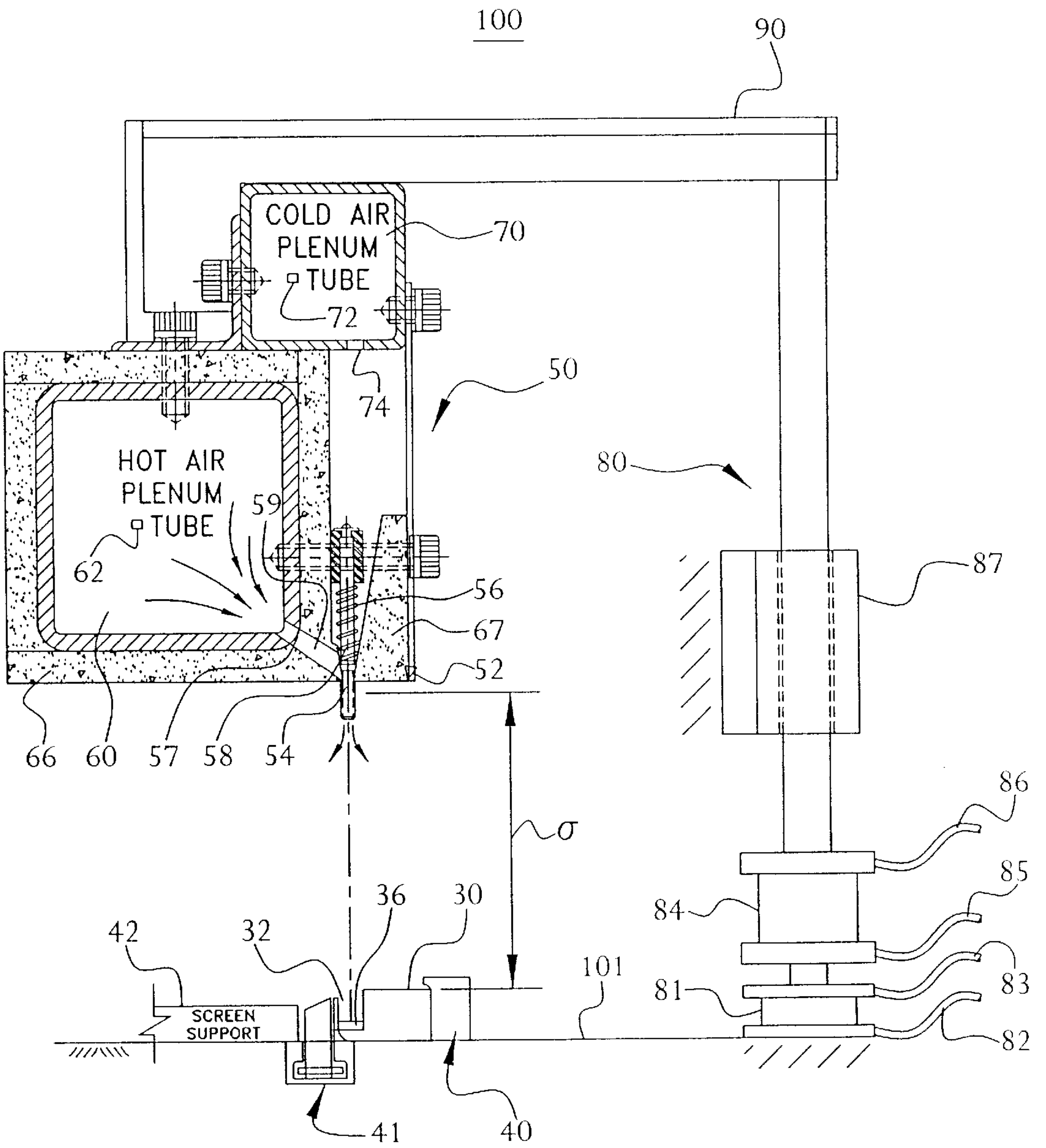
FIG. 2 is a side elevation view of one of the machines of FIG. 1, taken along section line 2—2 of FIG. 1.

FIGS. 2–4 show the nozzles 58 and pins 54 in line with each other within a single row. For example, the nozzles 58 and pins 54 may alternate with each other. In the configuration of FIGS. 2–4, the nozzles are directed downward. In a variation (not shown), the nozzles and pins may be arranged in two parallel lines which are proximate to each other. The nozzles of FIG. 5 may be slightly angled (depending on the relative positions of the nozzles and the adhesive), so the heated gas and cooled gas are obliquely applied to the adhesive or frame members.

Although the exemplary apparatus includes a single set of common nozzles that direct either hot air or cold air onto the adhesive, one of ordinary skill could readily configure an apparatus having a plurality of hot air nozzles and a separate and distinct set of cold air nozzles. For example, there may be a row of hot air nozzles and a separate row of cold air nozzles. Alternatively, hot and cold air nozzles may alternate within a single row.

FIG. 5 is an enlarged, partial cutaway perspective view (with the insulation 67 partially removed) of the nozzle section of the machine 100. Insulation 66 and 67 may be provided to surround the hot air plenum 60 and the interior of the common nozzles 58. The plenum 60 has a plurality of openings 57 which are connected to the common nozzles 58 by respective passages 59. The insulation 66 and 67 reduces the heat retained in the nozzles when the flow of heated air to nozzles 58 is interrupted, thus reducing the time for the temperature to stabilize upon switching from hot air to cold (Similarly, the insulation reduces time to switch from cold air to hot air.). This insulation may be preferred to minimize cycle time but is not required for the apparatus to function. In an alternate embodiment, if separate hot and cold nozzles are used (not shown), the insulation keeps the hot nozzles hot and the cool nozzles cool.

FIGS. 2–4 show the position and orientation of the nozzles 58 and insertion pins 54 in relation to the screen bar 30*a* in the loading/unloading position (FIG. 2), heating position (FIG. 3) and the screen insertion/cooling position (FIG. 4). In the loading/unloading position (FIG. 2), the hot air can be either blowing (preferred for pre-heating the plenum 60) or shut off. It may be preferable to have the cold air blower shut off when the apparatus is in the loading/unloading position of FIG. 2, to reduce wasted energy. In the heating position (FIG. 3) the only blower that is turned on is the hot air blower, providing air via tube 62. In FIG. 3, the nozzles 58 are directly above the groove 32. This position and orientation of nozzles 58 is optimized to direct hot air directly into the groove 32 (in a direction perpendicular to the surface of the adhesive) for focused heating of the adhesive 36, while minimizing the amount of heating applied to the frame substrate 30 which would increase the cooling required.

One of ordinary skill can readily place the nozzles 58 in other positions and orientations to direct the air onto the frame substrate 30 to indirectly heat the adhesive through the frame substrate 30. For example, if the nozzle is not directly over groove 32, the nozzle may be oriented at an oblique angle. Indeed, this may appear advantageous from the perspective of machine design simplicity, because the nozzles 58 can be further away from the pins 54. The nozzles 58 could also be below the frame, blowing on the bottom. Nevertheless, directly heating the adhesive 36 (instead of the frame 30) has a different advantage: less total heat is required to heat the adhesive 36 to its melting point when the heat is directly applied to the adhesive. This reduces both the heating time to melt the adhesive 36, and the subsequent cooling time. Cooling time is especially reduced by applying heat to the adhesive instead of the frame. If the frame were heated, residual heat in the frame would be conducted back to the adhesive during cooling, increasing cooling time and possibly remelting cooled adhesive.

In the insertion/cooling position (FIG. 4) the only blower that is on is the cool gas blower (not shown), providing gas via tube 72. Cool gas (for example, room temperature air) from tube 72 passes through the cold air plenum 70 and out through the same (common) nozzles 58 as the hot air. The pins 54 are positioned proximate to the nozzles 58. The apparatus may be configured with separate hot and cool gas blowers (not shown), or there may be a single blower coupled with appropriate valving to both hot and cool gas plenums for circulating both hot and cool gas.

Optionally, the hot air tube 62 and cold air tube 62 may each have a means to limit reverse flow of air. For example, there may be a means for limiting flow of the cool gas into hot air tube 62, and/or a means for limiting flow of the hot gas into the cool air tube 72. Each of these limiting means may comprise a lightweight flapper valve (not shown).

In another optional variation, a flapper valve (not shown) may be provided in the hot air stream, while allowing a trickle of cold air to flow throughout the heating, inserting, and retracting steps of the fabrication process. This may help reduce heating of the cold gas plenum.

As shown in FIGS. 2–5, the exemplary actuator 80 includes a linear bearing 87 to maintain the alignment of the support arm 90, and a pair of actuating cylinders 81 and 84. In the example, cylinder 84 has a relatively long stroke, and cylinder 81 has a relatively short stroke. Cylinders 81 and 84 may be either hydraulic or pneumatic cylinders. Cylinder 81 has a pressurized input line 82 and an output line 83. Cylinder 84 has a pressurized input line 85 and an output line 86. The pressurized lines 82 and 85 are each coupled to one or more raise valve assemblies (not shown). The raise valve assemblies may include conventional position control valves (e.g., spool valves, not shown), and may include check valves (not shown) to prevent backwards flow.

To maximize safety, the apparatus may be biased (using springs, for example) to the raised position, and only moved to the lowered position when actuated by the hydraulic pneumatic cylinders.

Each raise valve has an input to receive the pressurized gas or fluid from a pump (not shown). Output lines 83 and 86 may be coupled to lower valve assemblies (not shown). The lower valves controllably release the gas or fluid from the cylinders 81 and 84 as desired to lower the support arm 90. If cylinders 81 and 84 are hydraulic cylinders, then the lower valves return the hydraulic fluid to tank.

The pair of cylinders may be operated in at least two optional ways. In a first method, both cylinders are extended in the raised position of FIG. 2. The large cylinder 84 is lowered completely to move the insertion assembly 50 into the heating position of FIG. 3. Once heating is complete (7–10 seconds at 350° F. for the 6107 adhesive), then the short cylinder 81 is lowered to the position of FIG. 4, to perform the actual insertion step.

Although the exemplary embodiment shows actuating cylinders, one of ordinary skill recognizes that other conventional mechanical actuators may be used.

Figure 18:
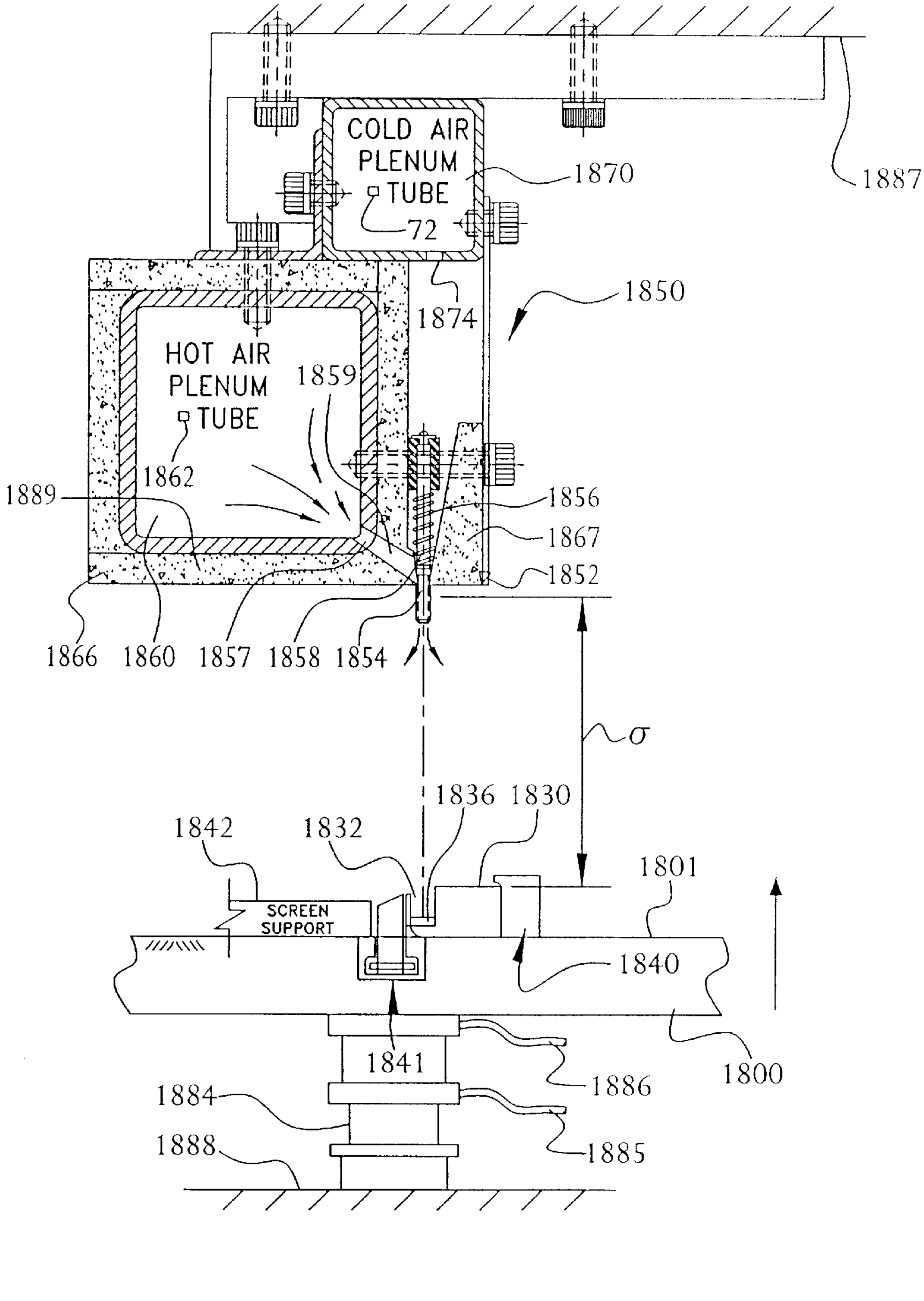
FIG. 18 shows a further exemplary embodiment of the invention.

FIG. 18 shows an alterative design, in which the inserting apparatus is included in a body 1850 that is fixed to the ceiling 1887 or to a rigid overhead support (not shown) fixed to a floor mounted riser (not shown). In this example, the plenums 1860 and 1870, the nozzles 1857 and the inserting pins 1854 are all fixed relative to the ceiling. The working surface 1801 is mounted on a vertically movable platform 1800. Rather than raising or lowering the inserting apparatus, the screen and frame materials are raised to meet the inserting apparatus. This may be a simpler configuration, because the components that are connected by hoses and tubes to the air blower(s) are all fixed (to the ceiling).

Reference is again made to FIG. 1. FIG. 1 shows a preferred configuration of the apparatus 100 in plan view. FIG. 1 shows an "L" shaped assembly, capable of securing two sides 30*c* and 30*d* of a screen assembly simultaneously. A screen bar frame 30 is shown in position along with pre-loading blocks 40. FIGS. 24 show an exemplary pneumatic cylinder actuator assembly 80 to position the plenum block 50 in the three different positions as shown in FIGS. 2–4.

The plurality of nozzles 58 may include nozzles proximate to all four frame members 30*a*–30*d* to heat all four members simultaneously for screen insertion. Of course, the apparatus may also be configured to bond one side at a time. It is preferred, however, to heat and insert only two or three sides simultaneously rather than all four sides, as this simplifies the design of the machine and reduces set-up time for different size screen assemblies. It may be most preferred to heat and insert two sides 30*c* and 30*d* using an "L" -shape nozzle and pin insertion assembly. Once two sides are completed (as described herein) the frame 30 is removed from the machine 100, rotated 180 degrees and re-inserted into the machine 100 to complete the other two sides of the screen assembly.

Similarly, for an octagonal window (not shown), it may be preferred to include nozzles 58 and pins 54 for heating and inserting two contiguous sides simultaneously. Instead of the pins being arranged in a right angle, the pins may be arranged in a 135° angle, so that any arbitrarily sized equilateral octagon is accommodated by one machine. The first two sides are bonded. The frame is rotated 90 degrees, and the next two sides are then bonded. This is repeated a total of four times, so that all eight sides are bonded.

Additional configurations for non-rectangular windows may include an "L" shaped apparatus with articulating arms, to accommodate a variety of angles between sides. Alternatively, any polygon can be accommodated by configuring the apparatus to bond only one side at a time.

Further, the apparatus may be configured with pins on two opposite sides (not shown). For example, there may be one fixed row of pins and a movable row of pins parallel to the fixed row of pins. The movable row of pins may be moved closer to (or further from) the fixed row of pins, to accommodate two sides of a rectangular or octagonal window simultaneously.

Only one degree of freedom, namely up and down motion, is used in this example to position the heating, inserting and cooling apparatus 52. Although other arrangements may include additional degrees of freedom to position the inserting and cooling apparatus 52, the single degree of freedom (with three positions) may be preferred to minimize cost and design complexity.

Other exemplary arrangements (not shown) may include having separate hot and cold air nozzles, optionally locating the hot and cold nozzles in separate rows with separate angles to direct the air onto the adhesive. If separate rows of hot and cold air nozzles are included, it may be necessary (depending on the location and angle of the nozzles) to either move the frame, or move the apparatus relative to the frame, when switching between hot and cold air.

FIG. 1 shows a work station including two machines 100 in service orientation with the operator in between the machines. This may be the preferred arrangement as it allows one machine 100 to be loaded and unloaded while the other machine is performing the automated insertion sequence. This approach is believed to maximize throughput for a single operator.

As shown in FIG. 1, the heating, inserting and cooling apparatus 52 is located closer to the outside of the "L" members 90. This arrangement may be more preferred generally, as it is versatile and is preferred for larger screen assemblies where the operator stands between machines 100 as shown in FIG. 1. Having the pins 54 and nozzles 58 to the outside of the "L" facilitates viewing and positioning the screen cloth 34 prior to insertion.

Figure 12:
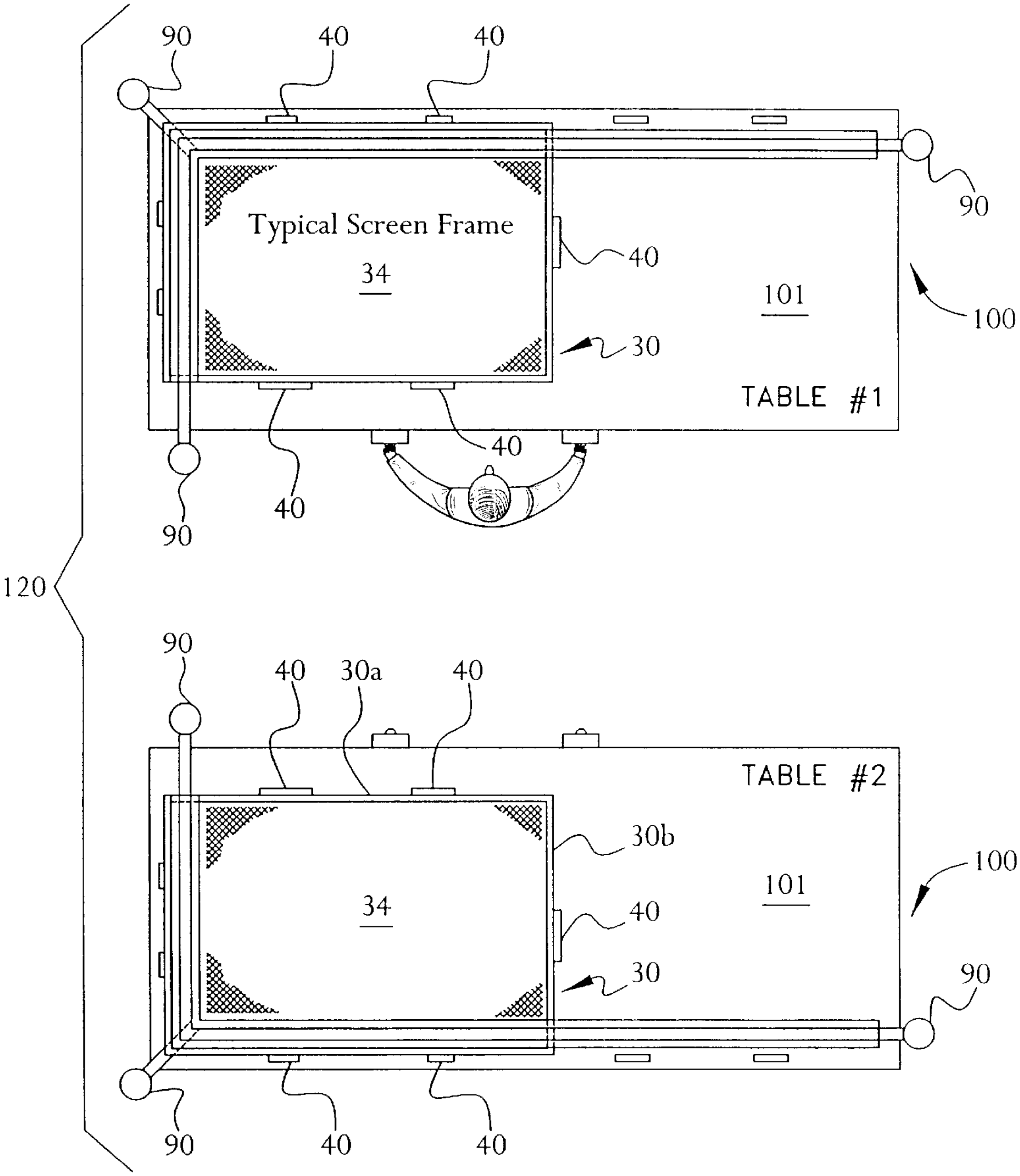
FIG. 12 is a top plan view showing a second exemplary station including two frame assembly machines according to the present invention arranged in an alternative configuration.

FIG. 12 shows an alternative for positioning the two machines 100. The heating, inserting and cooling apparatus 52 may alternatively be located on the outer perimeter of the two-machine configuration, further from the operator. This configuration may be preferred for smaller width machines that are limited to making smaller width screen assemblies. This alternative configuration, being narrow, may be easier for handling (i.e. loading and unloading) smaller screen frames. For larger screens (i.e. greater than approximately 60 cm wide), viewing and positioning the screen cloth 34 becomes difficult with the configuration of FIG. 12.

In both the configurations (FIGS. 1 and 12) the pins 54 and nozzles 58 are preferably arranged along the side of the apparatus closer to the operator.

Insertion Pin Design

The pins 54 are used both to insert the screen cloth 34 and remove the slack from the cloth. Essentially, the action of pushing the screen cloth 34 past the tensioning step 32, (which is preferably a groove), pulls the cloth 34 taut and pulls out small wrinkles. The taut screen 34 thus holds the pre-bowed frame members 30*a*–30*d* straight upon removing the assembly 30 from the pre-loading blocks 40 upon cycle completion. In effect, both the insertion of the pins 54 over the tensioning step 32 and the pre-loading of the frame 30 contribute to consistently setting the desired tension. Thus, it is believed to be most preferred to use both means together. However, tensioning may be achieved by either method, if used alone.

The insertion pins are large enough to push the open mesh screen cloth 34 into the molten adhesive 36 without passing through the mesh and missing the strands. If the tensioning step 32 is in a groove, the pins 54 must be sized to fit into the groove. The exemplary pins 54 have an axis of rotational symmetry; they are generally approximately cylindrical in shape. In experiments conducted by the inventor, the preferred pin diameter was greater than 0.060" and smaller than 0.135" to work effectively with common fibreglass window screen and a screen bar groove of 0.140". The most preferred diameter observed was 0.100" to 0.120'. Rectangular shaped pins with the same overall dimensions appear to function equally well. One of ordinary skill in the art can readily provide alternate pin cross-sections without any undue experimentation.

The mechanism of insertion using pins 54 is different from the spline insertion mechanism in the prior art. The pins 54 push the screen material 34 into the adhesive substantially without any friction between the screen and the mounting surface. The screen is held in place by the adhesive, not by friction. Because this method does not rely on friction between the screen material and the mounting surface, it is possible to use thinner screen bar material than could be used with conventional spline methods. In contrast, the spline technique relies on friction to hold the screen to the frame; a heavy frame material is needed to absorb the insertion force.

The preferred spacing of the pins is between 0.63 cm (0.25 inch) to 2.54 cm (1.0 inch) to achieve a practical design. Pins spaced further apart than 2.54 cm are not as effective at pushing the screen 34 in the molten adhesive 36 between the pins. Pins closer together than 0.63 cm do not improve the insertion and only add cost. The most preferred spacing is approximately 1.27 cm.

It is important for the pins 54 to extract cleanly from the adhesive 36 (after it has solidified) without undue forces and without strings of adhesive forming as the pins are extracted. Waiting until the adhesive 36 has fully solidified (forced air cooling helps to reduce the cooling time) avoids formation of strings in the adhesive upon extracting the pins 54 from the adhesive 36. Preferably, the pins 54 are smooth (preferably polished), or coated with a release coating such as tetrafluouroethylene (TFE) or the like, to prevent the adhesive 36 from bonding to the pins 54. Exemplary pin materials include aluminum, brass and stainless steel. Stainless steel offer the best durability, corrosion resistance and surface qualities for extraction and is thus believed to be the preferred material. Other materials such as ceramic or high temperature plastic may also be used. Further, pins formed of chrome (or plated with chrome) or TFE are also contemplated.

Spring loaded pins 54 may travel approximately the depth of the groove 32 and allow the screen 34 to be assembled without interference by the pins 54 at the corner key of the frame 30 being assembled. Essentially, the pins 54 are pushed up, compressing the springs 56, at the comers of the frame 30. Thus, it is unnecessary to remove pins 54 to accommodate different sized screen frames 30. This feature may be preferred over designs (e.g., FIG. 17) in which the pins are adjusted or removed to accommodate differently sized frames, which increases set up time between fabrication of two screen assemblies having different sizes. In the exemplary embodiment, the springs are intended to be compressed only when there is interference at the comers. Along the sides, the remaining pins inserting the screen typically do not compress their respective springs.

Figure 17:
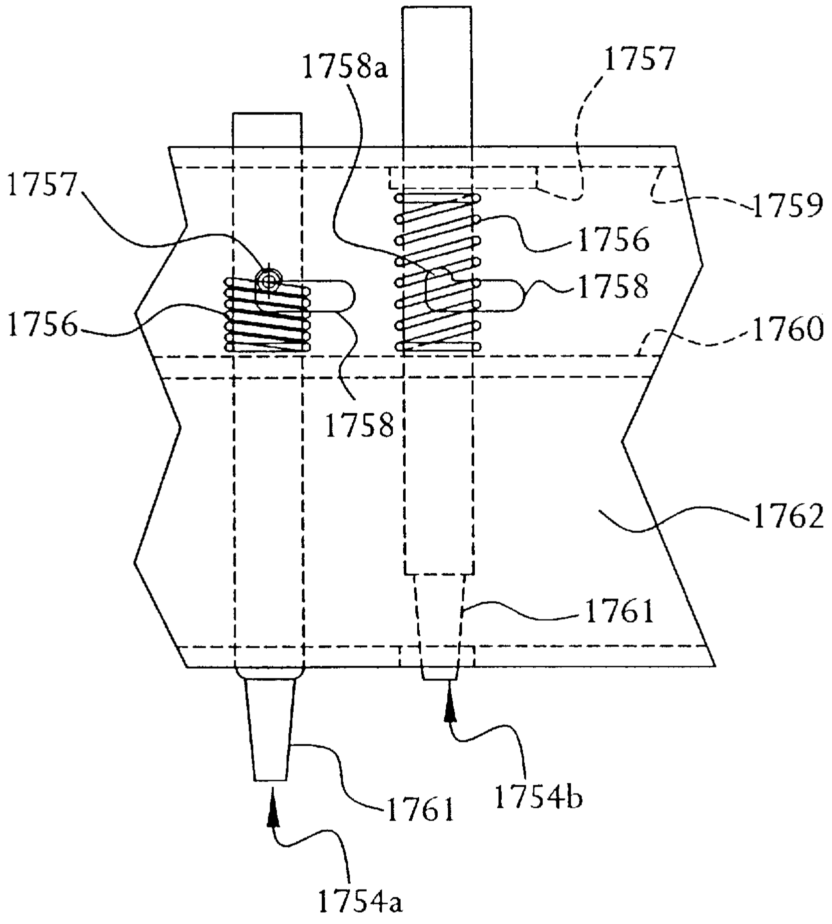
FIG. 17 shows an alternative embodiment of the inserting pin shown in FIG. 5

FIG. 17 shows a variation of the pins. Each bayonet pin 1754*a* and 1754*b* has a roll pin 1757 mounted perpendicular to the axis of the pin. Bayonet pins 1754*a* and 1754*b* may be easily switched (manually) between two different positions, as an alternative to using spring loaded pins. In FIG. 17, the left pin 1754*a* is in the extended position, and the right pin 1754*b* is in the retracted position. A bias spring 1756 biases the bayonet pins 1754 towards the retracted position of the right pin. Spring 1756 is compressed between the roll pin 1757 and a flange 1760, pulling the pin 1754*b* towards its retracted position.

The pins 1754*a* and 1754*b* are sandwiched between a front web 1762 and a rear web (not shown) behind the front web, forming a channel. Roll pins 1757 are longer than the width of this channel, so the pin 1754*b* cannot rotate freely within the channel. The front web 1762 has a horizontal slot 1758 that allows roll pin 1757 to rotate only when the roll pin is positioned at the height of the slot. With roll pin 1757 at the height of the slot 1758, pin 1754*a* can be (manually) rotated until roll pin 1757 reaches the detente 1758*a*. If pin 1754*a* is released with roll pin 1757 projecting through detente 1758*a*, pin 1754*a* is prevented from inadvertent rotation. Thus, pin 1754*a* is locked in the extended position, as shown.

To switch a pin 1754*a* to its retracted position, pin 1754*a* is pulled down, to free roll pin 1757 of detente 1758*a,* and pin 1754 is rotated until the roll pin 1757 is freed from slot 1758. Pin 1754*a* is then released, and spring 1756 retracts pin 1754*a* to the position of pin 1754*b*.

Using the pins shown in FIG. 17, the pins near the center of the row of pins may be held rigidly in the extended position, while pins over the corner keys of the row are retracted so as to avoid interference with the relative movement between the inserting apparatus and the frame being assembled.

Another aspect of the pins 1754*a* and 1754*b* is the use of a tapered end 1761. The tapered ends assist in ensuring that the adhesive does not stick to the pins with the pins are removed. By including only a few degrees of draft angle, the cleanness of the extraction is significantly improved.

Tapered end 1761 also helps assure proper insertion, even if there is a slight misalignment between the pin 1754*a*, 1754*b* and the groove or tensioning step of the frame.

The tapered pin 1761 may even allow the use of a pin size that approaches the width of the groove, whereas a straight pin would be more likely to catch on the edge of the groove in the event of any slight misalignment. If pins are used that approach the size of the groove, then there would be friction between the screen 34 and the sides of the groove during insertion. This friction will cause greater tension in the cloth during insertion, and could result in localized over-tensioning and visible distortion at the pins. To prevent hourglassing if pins that approach the size of the groove are used, stop blocks should also be used inside the frame. Stop block 41 is a backstop to limit the amount of movement to ensure that the screen bar is held straight when the pre-loading block 40 is pushed against the screen bar frame on two sides.

In a farther variation of the exemplary embodiments, the pins may be formed of adhesive. Instead of using a pre-installed adhesive, the adhesive pins may be used to insert the cloth. Once the cloth is inserted, the pins may be melted using heated gas or heat from the frame, as described above. The frame and adhesive can then be cooled using cool gas provided from a plenum, as described above. If glue pins are used, the diameter of the pins should be larger than the diameter of the metal pins described above, to insure good contact and wetting between the adhesive and the surfaces of the tensioning step. In this variation, the cloth can optionally be applied to all four sides simultaneously.

Methods of Heating

Although many different methods of heating would be effective for practicing the present invention, forced convection with hot air blowing directly onto the adhesive 36 is believed to be most preferred, because it is simple, fast, consistent and controllable. It is also the most cost-effective approach. Focussing the hot air onto the adhesive 36 (and not onto the surrounding frame substrate 30*a*–30*d*) quickens the melting of the adhesive 36 and avoids warming the substrate excessively. Keeping the frame substrate as cool as possible during the heating cycle reduces the cooling cycle time, because a cooler substrate sinks the heat away from the adhesive 36 more rapidly. Also, increasing the impingement velocity of the air onto the adhesive 36 increases the mass flow rate of air and the convective heat transfer coefficient, and thus increases the rate of heating. The trade-off is increased cost, and increased noise.

Other heated gases may be used, including, for example, nitrogen or an inert gas.

To achieve a 10 second heating time with an exemplary Henkel 6107 polyamide adhesive, air at 350° F. and 2 standard cubic feet per minute (SCFM) per inch is blown directly onto the adhesive 36, through the screen 34. (The 350° F. temperature does not create a hazard). Although faster rates may be achieved by increasing the flow rate, this is a reasonable, effective rate of heating. Increasing the temperature would also increase the heating rate, but may generate undesirable smoke.

A 2"×2" (5 cm ×5 cm) plenum having an attached nozzle with an opening of 0.050" (1.27 cm) wide and continuous in length (at least as long as the screen bar) positioned approximately ¼ (0.63 cm) away from the screen frame 30 was found to be effective (see FIG. 3). To achieve the desired 2 SCFM of 350° F. (177° C.) air per inch for a machine that can secure 2 sides of a 6'×3' (182 cm ×91 cm) screen simultaneously, approximately 200 SCFM total air volume is used. A minimum temperature for the hot air is greater than the melting temperature of the specific adhesive used.

Many different methods may be used to supply the hot air to the plenum 60. The exemplary method is to pass air from a blower (not shown) through an electric heat exchanger (not shown), which is simpler, or indirect gas fired heat exchanger (less expensive). To deliver the hot air using the electric heat exchanger, a Leister ASO blower, model 9K attached to two Leister 10,000S tools, model 8D7 attached to each end of the "L" shaped plenum (see FIG. #3) may be used. Leister ElektroGeratebau is located at 6056 Kagiswil/ Switzerland.

Although the embodiment of FIGS. 1–5 includes insulation around the nozzle, as shown in FIG. 18, the nozzles 1859 may be surrounded with a high thermal conductivity, high thermal diffusivity material 1889, such as copper. This allows heat from the nozzles to be rapidly dissipated between the heating step and the cooling step, so that the nozzle does not heat the cool gas that is used to cool the adhesive.

Referring again to FIGS. 1–5, conductive heating through the aluminum substrate of frame 30, although potentially faster than hot air (convection), may be difficult to achieve for some screen bar profiles, due to the contours of the profile shape of the screen bar. The frame 30 may be pre-heated by a variety of methods. The heated gas nozzles may be directed onto the frame 30 instead of the adhesive 36. Alternatively, the frame may be pre-heated in an oven or heating apparatus. If the frame is pre-heated, the maximum temperature of the oven or heating apparatus must be sufficiently low so as not to damage any plastic components (e.g., corners) of the frame. This would also facilitate insertion of four sides simultaneously.

Using conductive heating through the pins 54 or other elements directly onto the adhesive 36 would not be effective in heating the adhesive between the pins, and wrinkles in the material would result, unless the pins are very close together. Tensioning and cooling may also be more difficult with this approach.

Induction heating may be impractical, if used to heat the entire frame simultaneously and is more costly than hot air (convective) heating. Induction heating is better suited to a continuous feed operation, heating a small area only.

Infrared (radiant) heating is not preferred, as the higher temperatures involved may cause undesirable smoke from the screen if the screen is positioned between the emitter and adhesive during operation. Infrared is typically more expensive than convective heating and more cumbersome to integrate into the design.

Operation

Briefly summarizing, the assembly machine operator loads the machine 100 with screen frames 30, positions the screen cloth 34, initiates the automated assemble sequence by activating a control, and unloads the finished screen assemblies when they are completed. Preferably, the screen bar has pre-applied hot melt adhesive in the groove 32 (or at the base of the tensioning step). The assembly sequence is as follows:

1) The pre-assembled screen frame 30 is loaded onto the blocking table 101 where the pre-bow in the screenbar is straightened using blocking on the outside of the frame. Essentially, the pre-bowed screen bar is made into a frame 30, the frame 30 is then mounted onto the surface 101 of a table, and pre-loading blocks 40 are used to straighten or slightly hourglass the frames 30 (or distort the frame into any desired camber for tensioning the screen). This is called "blocking". After the screen cloth 34 is installed and the finished screen assembly is removed from the pre-loading blocks 40, the frame members 30*a*–30*d* attempt to return to their pre-bowed condition due to their inherent elasticity. When this occurs, the screen cloth 34 is put under additional tension beyond that imparted by the tensioning step during the insertion operation, but the frame members 30*a*–30*d* stay straight due to the high modulus of the screen material. Both the tensioning step 32 and pins 54, and blocking 40, contribute to create the desired screen tension, which is sufficient to remove wrinkles.

Figure 16:
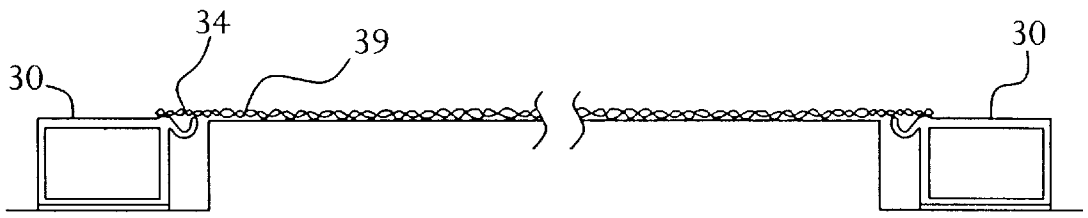
FIG. 16 shows a detail of the apparatus of FIG. 1.

2) The screen (cloth) 34 is positioned with its edges over the groove 32 or tensioning step, and extends past the groove 32 or tensioning step by a small amount to allow the subsequent insertion into the adhesive 36. As best seen in FIG. 16, screen fabric 34 is preferably supported on a surface 39 during the fabrication operation. Preferably, surface 39 has a height that is substantially the same as the height of the tensioning step. This allows the screen fabric 34 to lay flat during fabrication. Thus, the screen material does not sag, and there is less slack in the screen cloth during assembly, which improves consistency.

3) The automated sequence is started by activating a control (which may be, for example, a button, toggle, switch, knob, or the like.)

4) An elongated (tubular plenum) hot air nozzle assembly positioned over the screen bar lowers to blow hot air at approximately 350° F. (177° C.) into the area of the adhesive 36 (i.e. into and/or around the groove 32 or tensioning step where the adhesive 36 is located).

5) Once the adhesive is melted (approximately 7–10 seconds when the air flow is approximately 2 SCFM per linear inch) the flow of hot air is shut off, and the screen insertion pins 54, positioned in line over the groove 32, push the screen cloth 34 into the molten hot melt adhesive 36. The strands of the screen cloth 54 are thus embedded into either a bead (most preferred) of molten adhesive 36 or pushed in contact with a film of molten adhesive. (Note: this adhesive may have been applied previously, preferably at the time of manufacture of the screen bar 30*a*–30*d*). The screen cloth 34 is held in the molten hot melt adhesive 36 by the pins 54 until the adhesive 36 has solidified by cooling.

During testing, cooling was observed to take 10 to 15 seconds when the adhesive was allowed to cool naturally in the ambient air. Forced air cooling by blowing room temperature or chilled air onto the adhesive and onto the screen bar speeds up the rate of cooling and is thus preferred. By blowing room temperature air at the adhesive at approximately 2 SCFM per linear inch, the cooling time is decreased to approximately 5 seconds.

6) After the adhesive 36 is solidified, the insertion pins 54 are extracted and the finished screen assembly is removed. Allowing the adhesive to solidify completely before the pins 54 are removed ensures that the pins 54 extract cleanly from the adhesive 36. Extraction is not a problem when smooth pins 54 are used. A release coating such as TFE may be used on the pins to lower the force of extraction and reduce the possibility of adhesive bonding to the pins and is thus preferred (but not necessary.)

7) Assuming that the apparatus inserts two sides of the screen, and that a four side screen is being inserted, the screen is rotated by 180 degrees, and steps 1–6 are repeated. Then insertion of the screen material is completed.

Adhesive

Adhesive is applied in the groove 32 of the screen bar 30*a* or against or close to the base of the step 32' of the screen bar 30*a* '. In either case, the adhesive 36 is applied along the base 32*a* of the respective tensioning step 32. As is described below, the adhesive 36 may be applied as a film or bead.

In either the embodiment shown in FIG. 6 or that shown in FIG. 8, the adhesive 36 is secured to the screen bar 30*a* along the base 32a of the respective tensioning step 32. The term "secured" the term "bonded" as used herein is intended to include the generally accepted terms for adhesion of one material to another, i.e., mechanical interlocking, the formation of direct chemical bonds across the interface of the materials and electrostatic attraction, as discussed in Engineered Materials Handbook, Vol. 3, "Fundamentals of Adhesives and Sealants Technology". ASM International Handbook Committee, page 40. By far, the dominating adhesion mechanism, especially in the absence of reactive groups, is the electrostatic attraction of the adhesive to the screen bar as the adherent and vice versa. These are primarily dispersion forces (London forces) and forces arising from the interaction of permanent dipoles. These forces provide much of the attraction between the adhesive and adherent and contribute significantly to the cohesive strength of the adhesive polymer. Mechanical interlocking is assisted by the roughness and porosity of the adherent, in this case, the screen bar. The formation of covalent chemical bonds requires that there be mutually reactive chemical groups tightly bound on the adherent surface and in the adhesive.

Preferably, the adhesive 36 is applied while the screen bar 30a or 30a' is being made. The screen bar substrate itself may be made from metal, plastic, composites, wood and the like. By way of example, the screen bar 30a or 30a' may be made by either roll-forming or extruding metal (or by extruding plastic) into a segment of screen bar 30a or; 30a' and forming groove 32 (or step 32') along one side of the screen bar segment 30a (or 30a'). Equivalent methods may be used for other materials. At this time, adhesive 36 or 36' is applied in the groove 32 of the segment of screen bar 30a (or along the base of the step 32' of the segment of screen bar 30a'.) However, if desired, the adhesive 36 may be applied in a separate ("off-line") operation subsequent to the manufacture of the segment of screen bar 30a or 30a'.

During roll-forming, for example, the adhesive may be applied to the flat strip, before it passes through the rollers of the roll former, or, preferably, at or near the exit end after the screen bar has been shaped. If the adhesive is applied to the flat strip, however, the adhesive must be allowed to cool before roll-forming, which takes time and space, and it is more difficult to position the film or bead of adhesive correctly. In the case of extruded screen bar, the adhesive can only be applied after the screen bar has been formed, or off-line.

In each of the above cases, adhesive may be applied to the screen bar using a standard hot melt adhesive applicator using a bulk melter and a constant displacement pump or the like. Alternatively, a screw-type extruder may be used for this application. Either a film or a bead of adhesive having a desired thickness can be applied. For both types of applications (bulk melter or extruder), the hot melt adhesive (in bulk pellet or granular form) is heated above the melting point and pushed through a small orifice (nozzle) to stream into the groove 32 of the screen bar 30a–30d or along the base of the step 32' of the screen bar (or to its final location, if applied onto the flat strip before the strip is roll-formed), which is driven under the nozzle at a constant speed. The molten adhesive is allowed to cool to room temperature, and the finished screen bar with applied adhesive can then be stored. Typically, roll-forming lines run at a speed between 100 and 400 feet per minute and slightly less for aluminum extrusion. Off-line application typically runs at 100 to 300 feet per minute. By way of example, the reapplication of a 0.05" diameter bead of adhesive having a specific gravity of 1.02 (typical for polyamide) will need to be supplied at 8 pounds per hour to meet a 100 feet per minute line speed and 48 pounds per hour for a 300 feet per minute line speed.

Alternatively, the adhesive may be pre-extruded as a solid ribbon. The cooled solid ribbon of adhesive may be roll-formed into the screen bar during the roll-forming process. Near the end of the roll-forming process, when the screen bar material is close to its final shape, the ribbon of adhesive is introduced, and the material forming the screen bar may be bent around the ribbon of adhesive to retain the adhesive. The solid adhesive may also be pressed into the roll formed bar after the roll-forming is complete. Preferably, any roll-forming lubricants that may be present in the groove or tensioning step are removed before applying the ribbon of adhesive. Although applying the adhesive in a sold, pre-extruded form may add an extra step to the screen bar roll-forming process, it eliminates the need to heat the screen bar above 60° Celsius to obtain good adhesion between the screen bar material and the adhesive.

Preheating the screen bar just prior to application of the adhesive, to between about 40 and about 150° C., greatly improves the adhesion between the adhesive and the screen bar. Flame treatment of the surface of the screen bar also improves this adhesion. Therefore, when applying the adhesive, it is preferable to heat the screen bar at the location of adhesive application. Heating the side of the screen bar that the adhesive contacts significantly lowers the viscosity of the adhesive and allows it to flow easily at the heated interface. This provides a mechanical bond (interlocking) on a microscopic scale, in that the adhesive flows into any minute imperfections in the screen bar, as well as an electrostatic bond. It is preferable to heat the screen bar to a temperature in the range of about 40° C. to about 150° C., with about 60° C. to about 120° C. being preferred and about 60° C. to about 100° C. being most preferred. A propane flame or like heating element can be used to heat the screen bar in this manner. Corona treating, as is routinely used in the plastic and adhesive industry may also improve bond strength, depending upon the substrate.

Mechanical bonding also can be effected by perforating the bottom 32a of the groove 32 or the bottom 32a' of the screen bar 30a' adjacent to the step or lip 32b. When applied, the low viscosity adhesive flows through these openings to some extent and forms rivet-shaped beads or heads on the underside of the screen bar. When solidified, these beads mechanically lock the screen to the screen bar. These openings may be on the order of 1/32" (0.08 cm) round or square. This dimension may be varied as desired.

Further, adhesive bond can be lost if, for example, residual processing lubricants are not removed prior to applying the adhesive to the screen bar, if extreme and sudden temperature changes occur, if improper surface treatment or improper preheating of the screen bar is done, or if the adhesive is applied while too cold. For these reasons, both mechanical and electrostatic bonding are preferred. If, for example, the electrostatic bond is lost because of excess processing lubricants, the mechanical interlocking assures bonding. As discussed above, perforations in the screen bar adjacent to the step are the preferred mechanical interlock.

The adhesive is allowed to cool and set in the groove 32 of the screen bar 30a or along the step 32' of screen bar 30a'. Then, the segment of screen bar 30a or 30a', which includes the adhesive 36 or 36', can be stored for any desired time period, and used at a later date. Typically, the screen bar and adhesive assembly is sold in a standard lineal format typically 12 feet (3.6 meters) long. As discussed above, the lineals are cut to size and made into screen frames using corner keys or otherwise, in accordance with conventional practice.

Another aspect of the invention is the re-melting characteristic of the adhesive used. Generally speaking, a preferred adhesive (1) is applied easily, in liquid (e.g., melted (preferred) or solvated) form, (2) solidifies after application to the screen bar (for storage, shipment, assembly of the screen frame, etc.) and then (3) can be re-melted or reactivated (liquefied) during application of the screen to secure the screen to the screen frame.

The adhesive family known generally as "hot melt adhesives" have been found to have these attributes, since they can be applied in liquid form, solidify and then can be remelted or "re-activated" at the time of securing the screen (i.e., screen assembly).

Hot melt adhesives in a solvated, liquid form, can also be used. They are liquefied by the use of solvents such as toluene, MEK (methyl-ethyl-ketone), acetone, and the like. Once solvated, they are applied in liquid form and solidify upon solvent evaporation. They can then be re-melted in the same way the non-solvated forms are. The solvated forms, however, are less desirable, since the solvents add costs, and the evaporated solvents are typically toxic when inhaled.

The curable type of hot melt adhesives, known as "hot melt polyurethane adhesives" (i.e., PUR's or HMPUR'S) can also be used for this invention, if the adhesive is re-activated (at the time of securing the screen) before it cures. The window of time available, between application to the screen bar and cure, depends upon the adhesive formulation. For instance, Henkel macromelt adhesive A4676 is a hot melt polyurethane adhesive which has approximately four days before it is cured to the point where reactivating cannot occur, effectively. Also available, with similar s characteristics, is HL9527 available from European Fullers, Rangeview Road, Mississauga, Toronto, Ontario. Essentially, these adhesives react with the moisture in the air, causing permanent molecular cross-linking and thus become un-meltable (thermoset). The act of curing or cross-linking of the polyol and the isocyanate in these adhesives precludes the resultant polyurethane from remelting.

The A4676 adhesive, for example, has an acceptable application melt temperature of 100° C. and a green strength (tensile strength, before cure) of 4 to 5 pounds per linear inch of screen) which is more than adequate to secure the screen, once applied. The adhesive, upon curing, has a tensile strength of 2300 lb., a heat resistance temperature of 300° C. and a viscosity of 100 poise at 230° C. The advantage to this type of adhesive is the low application temperature and the relatively high heat resistance temperature, once cured. The disadvantage is the fact that the assembly must be completed shortly after the application of the adhesive to the screen bar. Thus, this type of adhesive has limited use. For the majority of applications, when the screen bar is stored for prolonged periods before screen assembly, the regular hot melt (non-curing type) adhesive must be used. For this reason, the regular hot melt type of adhesive is most preferred for practicing this invention.

The temperature during remelting of the adhesive is typically limited to below 400° F., preferably at 350° F., to prevent smoke (from PVC coated screen cloth). Hotter temperatures may be used, if any fumes exuded by the screen and/or adhesive are evacuated, trapped, and filtered or recycled.

The use of B-stage epoxy adhesive appears to be not nearly as practical for this invention. They could be made to work if formulated to be applied in a high enough viscosity state to allow handling, once applied to the screen bar; to have a high enough tack or green strength to secure the screen before cure; and to have a long enough shelf life, once applied to the screen bar, to allow screen assembly in time before natural crosslinking occurs. All of these conditions, however, make these adhesives difficult to work with in this environment. Another major drawback with these adhesives is the need for a long cure time at elevated temperatures. Typically, this requires the use of an oven. High intensity lasers have been used to greatly speed up the cure time, but may be impractical, from a cost perspective, for this invention.

An acceptable degree of bonding can occur without encapsulation of the strands of the screen-into the adhesive. Therefore, encapsulation is not essential to this invention. It is, however, preferred to encapsulate the strands of the screen using the adhesive, since this results in mechanical bonding as well as adhesive bonding. Further, encapsulation allows visual assurance that full melting and bonding have occurred.

For straight adhesion, without encapsulation, the adhesive can be applied as a film in a layer having a thickness between about 0.0005 to about 0.020 inches, and preferably, between about 0.003 to about 0.020 inches. The film option, if deemed acceptable by users, has the advantage of faster application speed and less cost. Whether a film or a bead of adhesive is used is really a matter of the degree of bond certainty that is desired by the particular user. When using a bead of adhesive, a layer having a thickness between about 0.020 to about 0.250 inches is preferred. When a bead is used, it is preferred to apply the adhesive in an amount to provide a layer having a thickness between about 0.030 to about 0.150 inches. This amount is sufficient to provide encapsulation.

An advantage of using a bead of adhesive in a groove (over a film of adhesive in a groove or along a bottom of a step or lip) is that the bead can be mechanically trapped by the walls of the groove, if the walls of the groove are tapered slightly to form a smaller spacing at the top (opening) than at the bottom.

In the exemplary embodiments of the invention, the primary mode of cooling at the time of screen assembly (as opposed to the time of application of the adhesive) to the screen bar occurs by conduction of heat into the aluminum substrate (screen bar) and secondarily, by convection/conduction into the surrounding air. Although it is also possible to allow cooling to occur naturally to minimize process complexity, forced cooling (by methods such as forced ambient or chilled air) is quicker. If forced air cooling is used, it may be either attached to the insertion tool (as in FIGS. 2–5) or in the form of a general fan or blower blowing air over the entire assembly or focused on the screen bar.

Forced cooling may be desired when hot ambient conditions exist or if the screen bar is preheated. Also, the screen bar must be cool enough to avoid remelting of the adhesive after the adhesive has cooled.

Because the preferred mechanism of cooling includes heat sinking into the screen bar, it is important to use a minimum amount of adhesive to avoid a thick barrier of low conducting adhesive that would interfere with heat flux from the hot adhesive to the screen bar.

For the adhesive to bond to the strands of the screen, it is necessary for the adhesive to cool below its melt point. For this reason, in this embodiment, it is preferred to utilize an adhesive (such as a crystalline adhesive) having a sharp melt point, so that the adhesive solidifies soon after cooling begins.

The adhesive also must provide adequate holding strength over the full range of service temperatures. Hot melt adhesives, particularly, polyester and polyamide adhesives have been shown to offer good flow and adhesive characteristics over the full temperature range experienced in service. Additionally, and when desired, these adhesives also provide good encapsulation (mechanical anchoring of the screen strands) characteristics.

Generally speaking, conventional thermoplastic pure polymer resins such as polyamide, polyester, polycarbonate and the like tend to have higher melt flow viscosities than is acceptable, resulting in lower screen holding strength than desired, because it is difficult to embed the strands of the screen in these adhesives. Straight polyamide (e.g., nylon) and polyester (PET) polymer resins (plastics) work only to a limited degree, since the viscosity and melt temperatures are higher with these pure resins. Also, these resins include none of the desirable additives, which lower viscosity and melt temperature and improve surface wetting (via surfactants). Although pure tensile holding strength may be achieved with high viscosity resins and adhesives, the lack of adequate holding strength puts a greater demand on the electrostatic or adhesive bonding component.

The polyester and polyamide families of adhesives have shown good performance at elevated service temperatures. Therefore, these adhesives are preferred. Nevertheless, this invention is not limited to these adhesives. Rather, any suitable hot melt or equivalent adhesive or thermoplastic resin having the required heat resistance temperature, bond strength and viscosity characteristics can be used.

Most manufacturers follow ANSI and CGSB standards for load requirements. Experiments show that in order to pass the CAN/CGSB 79.1 type II standard, a retention strength of approximately 9 pounds per inch width of screen is required when the load is applied in the plane of the screen (i.e., tensile loading). This value was obtained from tests conducted at room temperature. This value was measured using a 1 inch (2.5 cm) long screen bar sample with a piece of screen 1 inch by 2 inches (2.5 cm ×5.1 cm) attached. A tab attached to the screen bar and coplanar with the screen was inserted into one jaw of an Instron tensile testing machine while the screen was inserted into the other jaw. Samples were then loaded to the break point, which was recorded.

Existing spline retention technology which meets this load requirement of 9 pounds at room temperature was measured to drop to approximately 4 pounds per inch at 60° C. At −40° C., there was not a significant change in retention strength compared to room temperature measurements. The strength of hot melt adhesives also decreases at elevated temperatures, but may increase at slightly lower temperatures. In experiments, a strength of 30 to 35 pounds per inch was obtained at room temperature conditions using the Henkel 6206 adhesive. At 60° C., the strength was measured to be 20 pounds per inch. The present invention thus gives over three times higher retention strength over current spline technology over the range of service temperatures. This was unexpected!

In choosing a hot melt adhesive or thermoplastic resin to meet the requirements of hot weather conditions, one should consider various temperature values specified by the manufacturers of these adhesives or resins. Specific values include melt and glass transition temperatures as measured using differential scanning calorimetry (DSC ASTM test #E 698), heat resistance temperature using ASTM test method #D 2293 and softening point, usually determined using the ball and ring test, ASTM #E 28. Generally, the ball and ring temperature is approximately 8 to 10° C. greater than the melt temperature for polyester and polyamide adhesives.

The most important temperature value relating to selection of materials for this invention is the heat resistance temperature, since this value indicates the temperature at which movement under load occurs. This is referred to as "creep". Typically, a 500 gram load is used on a 1 inch by 1 inch (2.5 cm ×2.5 cm) lap seam (as opposed to a butted seam). The heat resistance temperature is an indication of when an adhesive begins to rupture under loaded conditions.

In short, the theoretical minimum heat resistance temperature allowable is the design ambient temperature. Nevertheless, practically speaking, it is generally necessary to have a heat distortion temperature to perform in the ambient conditions expected. In most areas (excluding tropical climates), this temperature is considered to be about 35 to about 45° C. Although it is most preferred to have adequate strength to hold screen tension up to 85° C. for shipping in closed containers (as per MIL-STD A10), a reasonable upper ambient limit (desert) temperature is considered to be about 50° C., where full performance strength is required. With the sun directly hitting dark colored screen bars, an additional 20° C. can be reached. Thus, a preferred minimum heat resistance temperature is about 70° C. for service, and about 85° C. for shipping. In temperate climates, it is generally acceptable to have a heat resistance temperature of about 55° C. This compensates for a 35° C. upper limit on ambient temperatures and a 20° C. differential for sunshine on dark colors. In tropical climates, these values are 45° C. plus a 20° C. differential, which yields a minimum of about 65° C.

Because the upper limit for ethylene vinyl acetate (EVA) type adhesives is generally considered to be about 75° C., this type of adhesive is acceptable from a temperature standpoint. However, EVA hot melt adhesives are not preferred because plasticizer migration from the screen may occur at elevated ambient temperatures resulting in loss in structural integrity, i.e., tensile strength.

In the adhesive industry, a 15 to 20° C. margin of safety is generally recommended between the heat resistance temperature of the adhesive used and the expected service temperature. Thus, an 85° C. service temperature expectation would suggest that the adhesive have a heat resistance temperature of about 100 to about 105° C. Adhesives in the polyamide or polyester family of hot melts meet this criterion. It is, however, more preferred to have an adhesive with a heat resistance temperature of about 120° C. This gives a 35° C. margin of safety over the 85° C. shipping temperature and 50° C. above the 70° C. dark color desert conditions under direct sunlight. Again, polyamide and polyester hot melt adhesives meet these values.

Thus, the adhesive should have a heat resistance temperature of not less than about 35° C. A heat resistance temperature between about 55° C. and about 180° C. is preferred, with between about 85° C. and about 150° C. being more preferred and between about 100° C. and about 130° C. being most preferred. Thermoplastic (hot melt) adhesives or resins are acceptable. These adhesives allow replacement of the screen by using a hot tool to first liquefy and allow removal of the old screen, and then replacement in a manner discussed herein. If desired, replacement screen also could be attached using conventional spline techniques, when using screen bar that has a spline groove. For this reason, a groove is preferred over a simple step.

The melting point value specified by the adhesive manufacturers is also important. This value is the temperature at which the adhesive begins to liquefy and flow under shear stress.

Although heating the adhesive by convection is preferred, a heated tensioning tool may be used. Because the preferred tensioning tool includes a plurality of pins that remain in the adhesive till the adhesive re-solidifies, the use of heated pins is expected to increase the cooling time. Nevertheless, if a heated insertion tool is used, it is important to use an adhesive having a low enough melt temperature (e.g., about 100° to about 225° C. (maximum)) to allow a heated tool temperature within an operating range, which limits smoke production. Smoke can be generated from either the adhesive or the coating on the screen. This range is about 200° C. to about 500° C. (with about 200° C. to about 400° C. being preferred, about 200° C. to about 300° C. being more preferred and about 250° C. to about 300° C. being most preferred) with minimum smoke production. The corresponding maximum ball and ring temperatures of the adhesive are about 210° C. (acceptable), about 150° C. (preferred) and about 120° C. (most preferred). Hot melt adhesives selected from the group consisting of polyester, polyamide, polyolefin, polypropylene, polyurethane, butyl and ethylene vinyl acetate (EVA) give satisfactory bond strength at s room temperature (about 20° C. and below). However, only the polyester and polyamide adhesive families seem to perform particularly well at elevated temperatures. Although the EVA's may generally work well, they are not preferred due to excessive plasticizer migration, which may occur at elevated ambient temperatures. This causes loss of bond strength.

Table I shows polyamide and Table 2 shows polyester hot melt adhesives that meet the high temperature requirements and melt flow characteristics. In these tables, the Macromelt adhesives are available from Henkel, Elgin, Illinois, whereas the Bostik adhesives are available from Bostik, Middleton, Massachusetts and the letter "a" indicates "acceptable" while the letter "p" indicates "preferred".

TABLE 1

| Polyamide Adhesive | Ball and Ring Temp. ° C. | Heat Resistance Temp. ° C. | Viscosity/ (temp.) Poise/(° C.) | Tensile Strength psi |
|---|---|---|---|---|
| Macromelt 6000-a | 200 | 155 | 4/(200) | 1900 |
| Macromelt 6202-p | 150 | 110 | 50/(210) | 450 |
| Macromelt 6206-a | 180 | 145 | 40/(210) | 1100 |
| Macromelt 6211-a | 145 | 125 | 25/(210) | 370 |
| Macromelt 6212-a | 110 | 80 | 35/(200) | 500 |
| Macromelt 6071-a | 95 | 70 | 10/(160) | 210 |
| Bostik 7239-p | 150 | 115 | 35/(200) | 385 |
| Bostik 4252-p | 150 | 110 | 22/(205) | 580 |
| Bostik 6240-a | 185 | 145 | 16/(230) | N/A |

TABLE 2

TABLE 2

| Polyester Adhesive | Ball and Ring Temp. ° C. | Heat Resistance Temp. ° C. | Viscosity/ (temp.) Poise/(° C.) | Tensile Strength psi |
|---|---|---|---|---|
| Bostik 4101-p | 120 | 95 | 145(230) | 3400 |
| Bostik 4103-p | 135 | 110 | 425(225) | 2290 |
| Bostik 4156-a | 160 | 137 | 23(215) | 2700 |
| Bostik 4175-a | 200 | N/A | 900(225) | N/A |
| Bostik 4178-a | 145 | 120 | 1000(215) | 3000 |
| Bostik 5182-a | 150 | N/A | 900(215) | N/A |
| Bostik 7116-p | 150 | N/A | 340(200) | N/A |
| Bostik 7199-a | 190 | 170 | 200(215) | 700 |

Another property that may be important, and one that separates thermoplastic (hot melt) adhesive from thermoplastic resins (plastics) is surface wetting. In this respect, melt viscosity is one of the most important properties of a hot-melt adhesive. In general, for a given adhesive, as the temperature increases, its viscosity decreases. Therefore, for a given hot-melt adhesive formulation, the temperature of the adhesive during application controls the viscosity, which greatly influences the extent of surface wetting. The bond formation temperature is a minimum below which surface wetting is inadequate. A hot-melt adhesive is applied at a running temperature, at which the viscosity is sufficient to wet surfaces, See the *Engineered Materials Handbook*, Vol. 3, "Adhesives and Sealants", ASM International Handbook Committee, page 80.

Preferably, the adhesive not only melts and flows, but also has a wetting action to spread easily over the surface of the strands of the screen to secure and/or encapsulate them. Adhesive manufacturers add waxes and plasticizers as surfactants to promote surface wetting. The amounts of these additives remain proprietary to the adhesive manufacturers. Loads applied to the screen must be carried by the adhesive. The adhesives listed in Tables 1 and 2 give acceptable bond and tensile strength to meet the load requirements of the installation. Preferably, the tensile strength of the adhesive is over 200 psi, but many adhesives having a lower tensile strength can still effectively carry the loads. Strand encapsulation enhances bond strength between the screen and the adhesive and mechanical interlocking between the adhesive and the screen is preferred to ensure full bond potential. Perforations in the screen bar, discussed above, is the preferred method of mechanical interlocking.

There was an initial concern that polyamide adhesives and EVA would soften over time while in contact with plasticized PVC screen, due to the potential plasticizer migration. (Polyester adhesives do not have the same susceptibility to plasticizer migration and thus, softening characteristics.) This concern with polyamide adhesives and EVA, however, has not been demonstrated in practice. It is believed that the amount of plasticizer available for migration is very low. For this reason, polyamides are, along with polyester adhesives, preferred.

Good weathering characteristics are advantageous, because many screen assemblies are exposed to full sunlight and extreme whether conditions. Industry standards generally demand mechanical properties to be, maintained over a ten year period. However, twenty years is preferred.

To enhance weatherability, it is generally known to add to the adhesive carbon black for blocking ultraviolet (UV) light, as well as light absorbers and light stabilizers. Also, adding enough carbon black to make the adhesive opaque is sufficient to block UV light. Generally, 0.5 to 2% by weight of the adhesive is adequate to block UV light, and 1 to 1.5% by weight is sufficient to make the adhesive opaque. Diminishing returns are experienced above 2%, and mechanical properties also can be adversely affected. Carbon black is preferred from a cost and performance standpoint. Alternatively, instead of adding carbon black to the adhesive to block UV from the sun, $TiO_2$ may be used. This would achieve a white color.

Benzotriazole is a suggested additive to act as a UV absorber for both polyamide and polyester adhesives. An example is Tinuvin 234, available from Ciba-Geigy, which is a 100% active chemical. This chemical may be added to the adhesive in an amount of 0.05% to 0.3%, with 0.1% be a typically specified amount, by weight.

Products which act as "hindered amine light stabilizers" (HALS) may also be added to the adhesive, in an amount between 0.05 to 0.3% by weight. 0.1% is atypically specified amount. Tinuvin 622, available from Ciba-Geigy, is a 100% HALS and is recommended for polyamide and polyester adhesives.

It is believed that using the accepted adhesives in a foamed form (with 20%–70% lower density) has an advantage of giving a larger bead size, for example, for a given mass per unit length - thus, lowering cost. A larger diameter bead increases the bonding area, which improves the bond strength. Also, the insertion speed is theoretically increased, as less mass is heated and melted from a given bead size. A Nordson model FM190 hot-melt dispensing unit is designed to apply foamed adhesives in bead form. Nitrogen is generally used as the foaming agent in such foamed adhesives.

The screen bars of this invention are designed to meet both the Canadian and U.S. type II standards for load resistance and pull out strength. (ANSI-SMA SMT 31-and CAN-CGSB-79.1-M91). In Canada, the load resistance test for a type f screen requires that a 75 lb. weight, or 37 lb. for a type I screen distributed over a one foot square diameter, be placed in the center of a three foot by three foot pre-clamped screen. The Canadian pull out test resembles a tensile test in which a one inch section of screening and screen bar are subjected to tensile loading in, for example, an Instron tensile testing machine. To satisfy this pull out test, screen samples must demonstrate at least 9 lb./inch resistance to tensile loads. If the spline or glue joint separates under a 9 lb. load, the screen fails the pull out test for type II screens.

The screen bars of this invention were designed to meet the customary screen dimensions as follows:

| BayForm B516 | BayForm B38 |
|---|---|
| D—.17 inches | D—.235 inches |
| T—.020 inches | T—.023 inches |

The above dimensions, shown in FIG. 6, are typical in the screen industry, whereby "D" represents the height of the tensioning step, "T" represents the thickness of the bar material, which is typically aluminum, and E represents Young's modulus of the screen bar material (10.3–106 psi for aluminum, 30–$10^6$ for steel). It is known through experience that a B516 aluminum screen bar generally fails the 75 lb. load test if its thickness (T) falls below 0.018 inches. Similarly, an aluminum screen bar manufactured to the B338 standard generally is known to fail the 75 lb. load test if its thickness (T) falls below 0.020 inches. When the gluing methods of the present invention are employed, however, instead of the prior art's spline technique, a thickness "T" of less than 0.018 inches for the B516 bar, and a thickness "T" of less than 0.020 inches for a B338 bar was sufficient to meet the 75 lb. load test. Moreover, the present gluing technique was tested in accordance with the Canadian 79.1 type II standard pull out test parameters. Under this test, a B38 type screen bar must meet at least 9 lbs. per inch in tensile load before the spline pulls out, or the screen separates. Using spline technology, a B38 bar thickness "T" was reduced from 0.023 inches to 0.018 inches for a standard spline product, and this product resulted in a tensile load of 6 lbs./inch tensile force test result, thus failing the test. When a B38 style bar having a thickness of only 0.016 inches and a glued joint pursuant to the teachings of this invention was similarly tested, it had a tensile force of 25 lbs., passing the test by a factor of safety of almost 3.0 (or of almost 6.0 for a type I screen).

Accordingly, the screen bars of this invention can be made thinner and stronger than prior art screen bars using splines. According to solid mechanics analysis, the conventional spline screen bar cross-sectional ratio "D(in.)$T^2$(in.$^2$)E(psi)" should be no greater than 41.3–$10^{-6}$ to meet the 75 lb. test. Using the present invention, the inventor contemplates achieving a ratio greater than 41.3–$10^{-6}$ to meet the CGSB-CAN 79.1 type II specification, and even 48.5–$10^{-6}$ or greater, with ratios as high as 65–$10^{-6}$ without failing the pull out test. Below in Table 3, examples of pull out test results for various thicknesses and tensions step heights employing a spline (Sets 1, 2 and 3) and the adhesive method of this invention (Sets 4, 5 and 6) are provided, easily demonstrating that the improved method of this invention increases the performance of screens subjected to a tensile load.

A screen and frame when so joined by a method according to the invention can pass a 37 lb. load test in accordance with break load at a thickness "T" at least about 10% less than the thickness "T" of a passing spline-retained screen and frame of like material undergoing said load test. For example, in Table 3, Set 2 specifies a spline type screen that failed the test, using 0.019 in. thick material. Set 5 specifies a screen according to the invention that passes the test with only 0.016 in. thick material. Because 0.016 is less than 0.019 (a failing spline thickness) by at least 10%, and a passing spline frame would require thickness greater than 0.019, an assembly according to the invention can easily be at least 10% thinner than a passing spline-retained screen frame of like material.

A screen and frame when joined according to the invention has a break load test value of at least 50% greater than a spline retained screen of like thickness "IT" and like tensioning step height "D". For example, in Table 3, Set 3 specifies a failing 0.016 spline with a 0.23 in. step height. The largest pull out load in sample set 3 is 5.769 lb. Set 5 specifies a passing frame screen assembly according to the invention, having the same thickness and the same tensioning step height. The minimum break load in sample set 5 is 18.22 lb., which is more than three times the pull out load of the spline type assembly of set 3.

TABLE 3

PULL OUT/BREAK LOAD TEST ANALYSIS

| Sample code | Pull Out load |
|---|---|
| Set 1: T = 0.018 in., D = 0.200 in. with spline, $D/T^2E = 59.9 \times 10^{-6}$ | |
| FM1 | 5.922 |
| FM2 | 6.276 |
| FM3 | 7.713 |
| FM4 | 8.056 |
| FM5 | 7.683 |
| FM6 | 6.824 |
| Set 2: T = 0.019 in., D = 0.200 in., with spline, $D/T^2E = 54 \times 10^{-6}$ | |
| FP1 | 8.236 |
| FP2 | 7.731 |
| FP3 | 6.156 |
| FP4 | 8.851 |
| FP5 | 7.570 |
| FP6 | 5.503 |
| Set 3: T = 0.016 in., D = 0.230 in., spline, $D/T^2E = 87.2 \times 10^{-6}$ | |
| 016P-1 | 5.769 |
| 016P-2 | 5.603 |

TABLE 3-continued

| PULL OUT/BREAK LOAD TEST ANALYSIS | |
|---|---|
| 016P-3 | 5.557 |
| 016P-4 | 4.416 |
| 016P-5 | 5.103 |
| 016P-6 | 3.850 |
| Sample code | Break load |
| Set 4: T = 0.0235 in., D = .230 in., Bostik 4156 polyester adhesive, $D/T^2E = 40.4 \times 10^{-6}$ | |
| IB4145-1 | 30.94 |
| IB4145-2 | 24.21 |
| IB4145-3 | 29.66 |
| IB4145-4 | 26.01 |
| IB4145-5 | 26.78 |
| IB4145-6 | 24.91 |
| B516 = D = 0.17, T = 0.020 | |
| B38 = D = 0.230, T = 0.0235 | |
| Set 5: T = 0.016 in., D = 0.230 in., 6206 Henkel adhesive, $D/T^2E = 87.2 \times 10^{-6}$ | |
| 016-6206-1 | 31.64 |
| 016-6206-2 | 19.83 |
| 016-6206-3 | 18.22 |
| 016-6206-4 | 20.52 |
| 016-6206-5 | 22.62 |
| 016-6206-6 | 24.93 |
| Set 6: T = .0235 in., D = 0.230 in., with Henkel 6206 with adhesive, $D/T^2E = 40.4 \times 10^{-6}$ | |
| 1-6206-1 | 28.15 |
| 1-6206-2 | 30.56 |
| 1-6206-3 | 28.08 |
| 1-6206-4 | 27.14 |
| 1-6206-5 | 25.38 |
| 1-6206-6 | 30.19 |

Although hot melt adhesives and thermoplastic resins are discussed above, the inventor contemplates that pressure sensitive adhesives and like bonding agents that provide acceptable results also could be used, if desired.

Tape

Although the exemplary assembly described above uses an adhesive that is applied as a film or as a strip, an adhesive tape may be used.

Figure 13A:
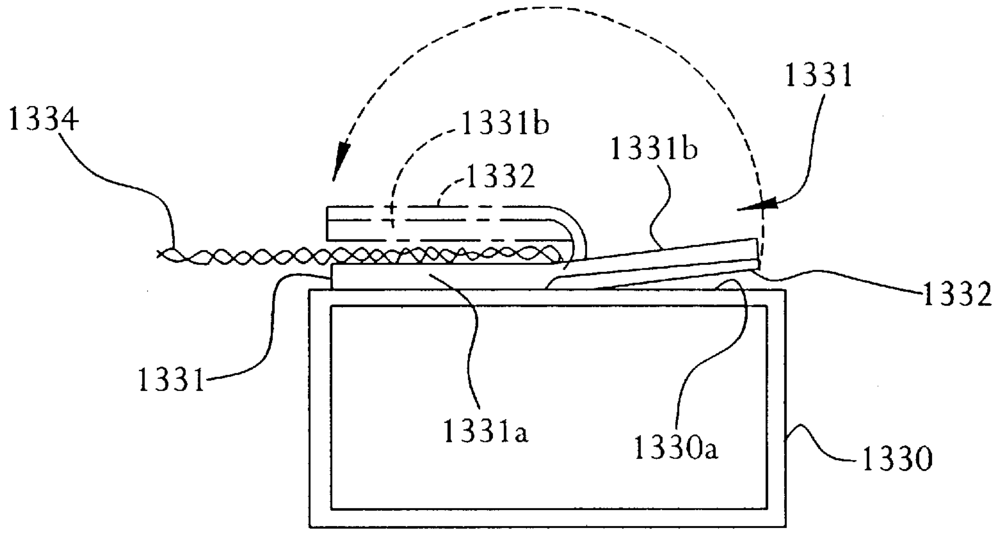
FIGS. 13A and 13B are cross sectional views showing a further exemplary embodiment of the invention, using an adhesive tape.

According to an embodiment shown in FIG. 13A, a tape 1331 is laid on the mounting surface 1330*a* of the frame 1330, with an adhesive surface of the tape facing away from the frame. Tape 1331 has adhesive on both sides. The tape may have: (1) a fixed portion 1331*a* that is fixedly attached to the mounting surface 133*a*; and (2) an extended flap 1331*b* that is not adhered to the mounting surface of the frame. In FIG. 13A, apiece of non-adhesive tape 1332 is inserted between the flap 1331*b* and the mounting surface 1330*a* . The bottom surface of flap 1331*b* adheres to the non-adhesive tape 1332. This prevents the bottom surface of flap 1331*b* from adhering to the mounting surface 1330*a* . The flap 1331*b* is free to be folded over the edge of the screen fabric 1334, as shown in phantom in FIG. 13A. Thus, the screen fabric 1334 is adhered between two layers of tape 1331*a* and 1331*b*.

Figure 13B:
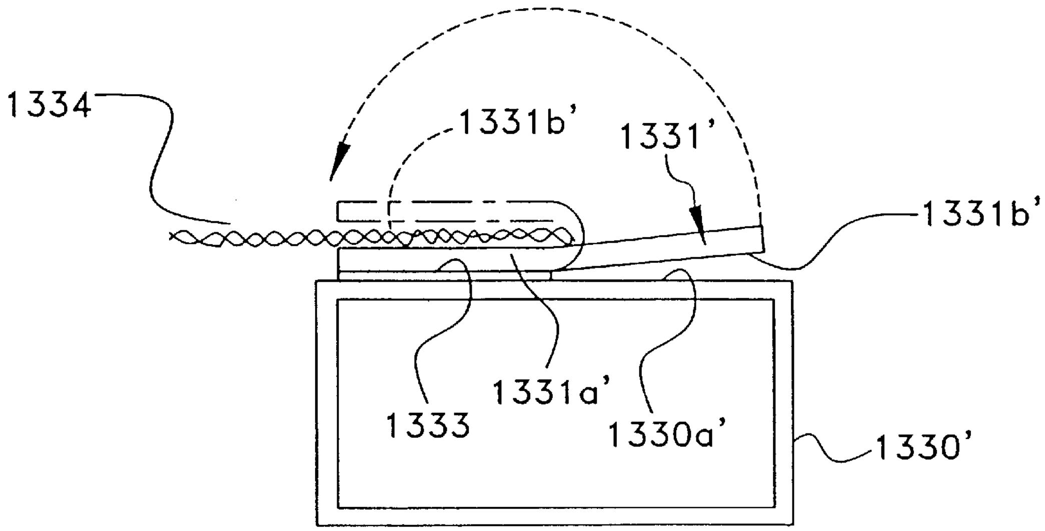

FIG. 13B shows a variation of the embodiment of FIG. 13A. A tape 1331' having only a single adhesive surface may be used. The tape 1331 is applied to the mounting surface 1330*a'* of the screen bar segment 1330', with the adhesive surface of the tape facing up, away from the mounting surface of the screen bar segment. A separate adhesive layer 1333 is used on the bottom of one half 1331*a'* of the tape, to fix that half of the tape to the mounting surface 1330*a'*. The resulting screen bar segment and tape combination is similar to the example of FIG. 13A, in that one half 1331*a'* of the tape 1331' is fixedly mounted to the mounting surface 1330*a'* of the screen bar segment 1330', and the other half 1331*b'* of the tape 1331 is a movable flap; the flap 1331*b'* can be folded over to capture the screen material 1334' between two halves of the tape strip 1331' (as shown in phantom in FIG. 13B).

Figure 15A:
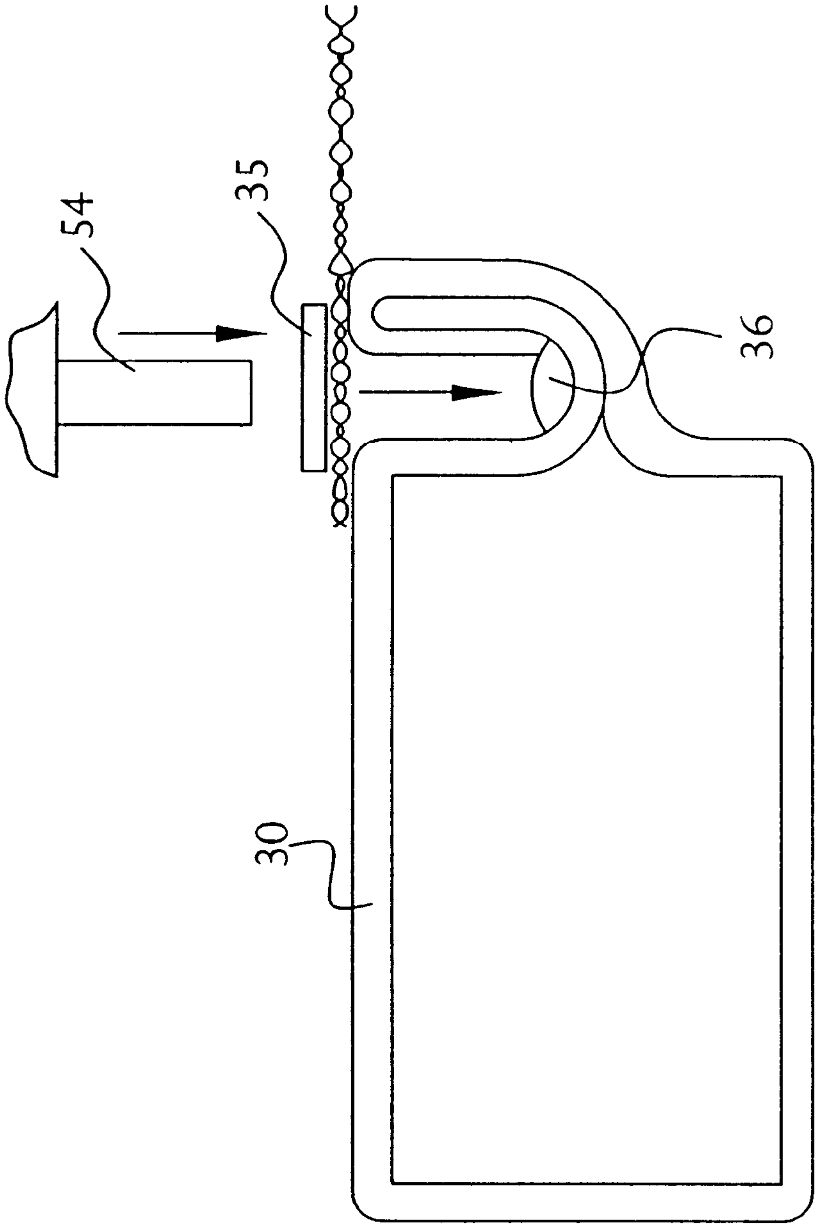
FIGS. 15A and 15B show a variation of the exemplary method using a shielding tape between the pins and the adhesive.
Figure 15B:
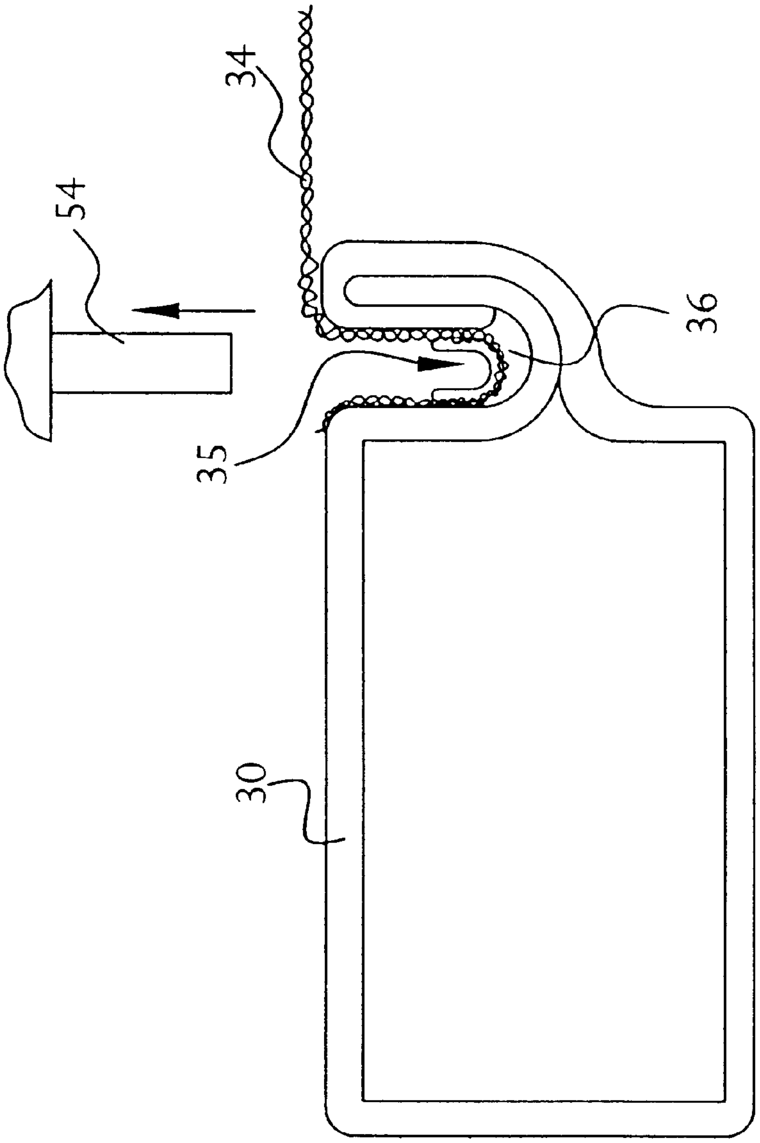

Alternatively, as shown in FIG. 15A, a non-adhesive plastic film or tape 35 may be interposed between the adhesive 36 and the pins 54 or other inserting tool (e.g., roller) during the insertion process. The tape 35 should be capable of withstanding high temperatures. The tape 35 may be, for example, cloth or polymeric tape. The tape 35 may be dispensed after the adhesive is melted, but before driving the pins 54 into the adhesive 36. In this case, the apparatus may be substantially as described above with reference to FIGS. 2–5. When the pins 54 insert the screen fabric 34 into the groove 32, the film or tape 35 shields the pins from contact with the adhesive. The film or tape 35 may be left in the groove after assembly, as shown in FIG. 15B. In a further variation of this method, other techniques may be used for melting the adhesive with the tape or film 35 in place, such as by microwaves, or by heating the frame to indirectly heat the adhesive.

Other Inserting Apparatus

Although the exemplary inserting apparatus is described above as a plurality of pins, other inserting apparatus may be used. It may be desirable to use one or more rollers instead of a plurality of pins. Insertion methods using a roller are described in greater detail in the parent U.S. patent application Ser No. 08/997,737, which is incorporated by reference herein.

Figure 14A:
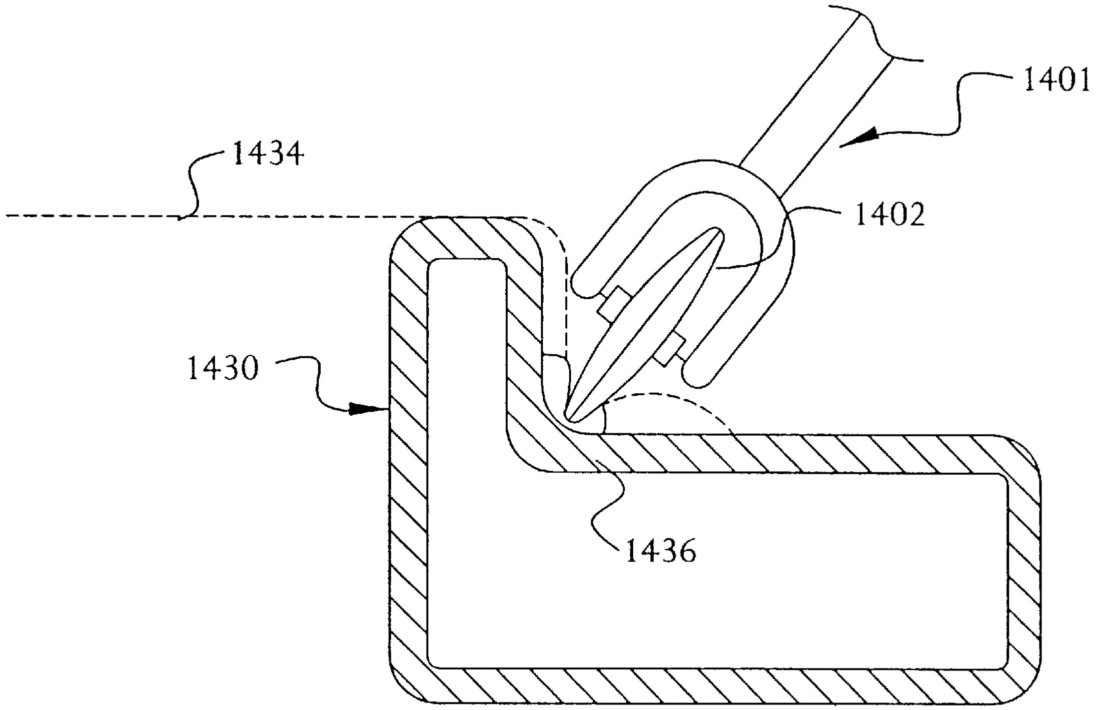
FIG. 14A shows a method of attaching a screen to a frame using a roller type inserting apparatus.

A roller can be manually or automatically actuated to travel along the length of a side of the frame. An example is shown in FIG. 14A. One, two or more sides of the screen may be inserted into the adhesive simultaneously. To simultaneously insert more than one side of the screen, a plurality of rollers are actuated by a plurality of actuators (not shown).

The roller may be heated to melt the adhesive. To avoid continuous increase in the roller temperature while the roller passes through the heated adhesive in successive assemblies, it may be desirable to cool the roller(s) in between sides.

As in the case of pins, a release coating, such as TFE may be used on the roller to prevent the adhesive from sticking to the roller. Alternatively, the roller wheel may have a permanent TFE coating. If the roller doesn't contact the adhesive, no release coating is required.

A cleaning device may be used at the end of each machine cycle to remove glue build-up from the roller. FIGS. 14B and 14C show an example of a device 1403 having a groove 1404 shaped like the inserting edge 1402 of the roller. The device 1403 is placed adjacent to the roller 1402. The roller 1402 is then passed through the device 1403, so the adhesive is squeezed and scraped off of the roller 1402.

Figure 14D:
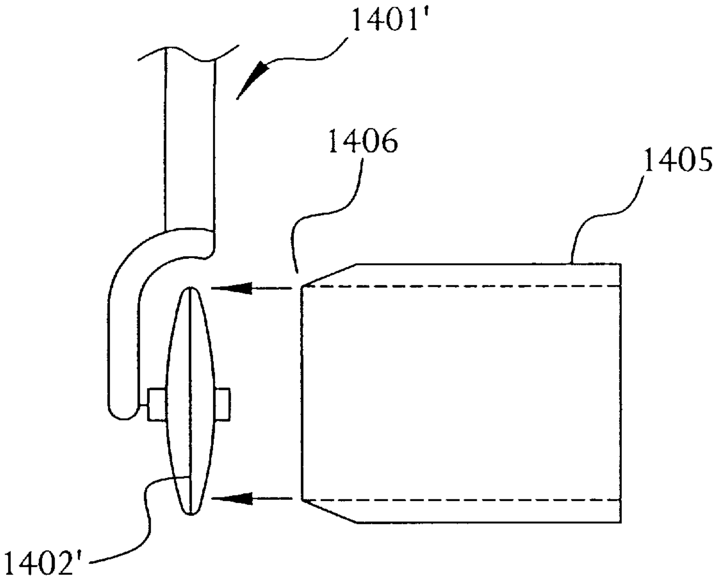
FIGS. 14B–14D show exemplary methods for cleaning the cutting tool shown in FIG.
Figure 14B:
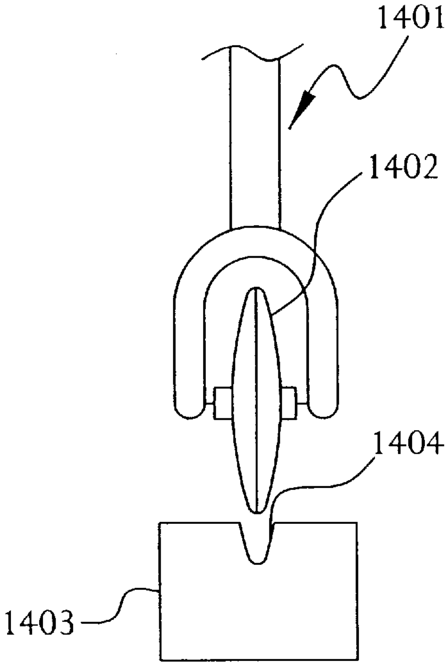
Figure 14C:
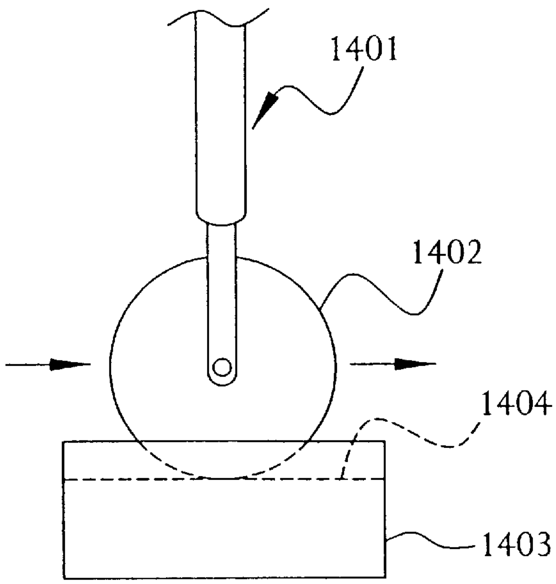

Another device for removing the adhesive from the roller is shown in FIG. 14D. Tool 1405 is in the form of a sharpened hollow cylinder. This cleaning tool 1405 may be used for an inserting wheel that has an open side. The cleaning tool 1405 has a circular cutting or scraping edge 1406 very slightly larger in diameter than the roller 1402'. Tool 1405 can fit over the roller 1402' in the axial direction, scraping the adhesive off in the process.

One skilled in the art can readily provide other tools for cleaning the adhesive off of the inserting roller 1402.

The roller may optionally be mounted to an apparatus (not shown) for dispensing adhesive, so that the roller trails behind the ribbon of adhesive by a predetermined distance; if the apparatus moves along the groove or tensioning step at a constant speed, then the roller inserts the screen material in at a predetermined time after the adhesive is dispensed in the groove or tensioning step. Alternatively, the apparatus may be stationary, and the frame may be mounted on an X–Y table, so that the same relative motion is provided between the frame and the roller.

In a further variation of this apparatus, a nozzle may be mounted behind the roller. The nozzle may provide heated gas if a thermosetting adhesive is used, or the nozzle may apply cooled gas if a pre-heated thermoplastic adhesive is used. As the apparatus moves relative to the groove or tensioning step, a ribbon of adhesive is applied, then the roller follows, and finally a jet of heated or cooled gas is applied to the adhesive.

In still another variation, the inserting apparatus may be a pin-roller (not shown) including a plurality of pins attached to a roller, and extending outwardly from the surface of the roller, in a radial direction. The roller may include a bearing assembly to provide smooth rolling action. Preferably, the pins are evenly spaced. The pins are spaced apart from each other so that the outer tips of any two successive pins are about 1.25 cm (0.5 inch) apart. The pins may be any of the types described above. Preferably, the pins are coated so that the adhesive does not stick to the pins. A release coating, such as TFE, may be applied to the wetted surfaces. The pin-roller may be about the same width as the diameter of the plurality of pins.

The pin-roller combination allows use of an application technique very similar to that described above with respect to a smooth roller, yet yields results similar to those achieved using a plurality of pins. For example, the screen frame may be preheated (to melt the adhesive therein) and blocked with pre-loading blocks. The screen cloth is placed on the frame, and the pin-roller is rolled through the groove of the frame to insert the screen. This may be done manually, or by machine. Alternatively, local heating may be used. A nozzle may trail behind the pin-roller. The nozzle may dispense a cool gas or fluid, which may be air, carbon dioxide, water, mist, etc. The cool gas or fluid cools the adhesive until the adhesive re-solidifies, completing the bonding operation. Alternatively, the frame may be permitted to cool by natural convection, or by forced convection from a large fan. Other cooling methods known to those skilled in the art may also be used.

Another exemplary roller type insertion device may have a corrugated or fluted edge (not shown). When the corrugated or fluted roller passes through the groove 32 of a screen bar segment, the insertion device makes an impression in the general form of a sine wave. Alternatively, a plain roller (of a type shown in FIG. 14A), may be used.

Still another exemplary method according to the invention includes a continuous feed process for inserting the screen fabric into one or more grooves of the frame. According to this embodiment, a frame is formed from four (or more) screen bar segments, each of which has a respective groove. Each groove in each screen bar segment extends across the entire length of the screen bar frame, from edge to edge, including both the length of the screen bar segment and the corner key. The grooves on each pair of adjacent screen bar segments continue onto, and intersect in, the corner key (not shown). For example, a four-sided frame should have a set of grooves in the general shape of a tic-tac-toe board, or a pound sign (#) with orthogonal sides.

A frame having grooves that extend from edge to edge can be continuously fed by a conveyor into an apparatus having a pair of insertion devices (preferably rollers, pin-rollers or corrugated rollers as described above) spaced apart from each other. By this method, the two rollers (or pin-rollers or corrugated rollers) simultaneously fit into the two parallel grooves on two opposite sides of the frame. One of the insertion devices may be fixed, and the other movable (in the direction perpendicular to the groove), to accommodate differently sized frames. The two insertion devices can each have a heat source just ahead of the insertion device, to melt the adhesive just before insertion. Optionally, a nozzle may blow ambient air on the adhesive just behind the insertion device to speed up the cooling. Once the screen cloth 34 on the first two sides is inserted, the frame is rotated by 90 degrees, and the remaining two sides of the screen cloth 34 are inserted in the same manner.

Alternatively, instead of feeding the frame through a stationary insertion apparatus, the frame may be held still, and two (longitudinally) movable insertion devices (preferably, rollers, pin-rollers or corrugated rollers) may be passed through the grooves simultaneously. Further, although the exemplary frames described above include the grooves or tensioning steps on the face of the frame, the grooves may be located on the side edges and ends of the frame.

In a variation of this exemplary process, the frame may be loaded onto a conveyor, which transports the frame through an oven. The frame is pre-heated in the oven. The heated frame exits the oven on the conveyor and moves to a press having insertion devices similar to those described above. The conveyor stops when the frame is positioned at the insertion devices. Two movable arms and two stationary arms straighten the frame for tensioning. The screen cloth is placed in position over the frame (with the edges over the grooves), preferably using a gantry type robot. Other types of positioning apparatus may be used. At least one, but preferably four, insertion devices (one on each side of the frame) are simultaneously inserted in the grooves, inserting the screen cloth into the grooves. Ambient air may then be blown over the frame to reduce the cycle time. Using this variation of the exemplary method, the entire assembly process can be automated.

Having the groove extend all the way to both edges of the frame may be advantageous for the above described batch type insertion process, as well as the continuous process described immediately above. With the groove extending all of the way to the edge, there is no need to retract the bayonet pins (shown in FIG. 17) at the corners of the fame during the batch insertion process; the insertion device can be applied over the comers in the same way as in the middle of the frame.

Other Screen Bar Configurations

Although the exemplary embodiments described above include a groove or tensioning step, other screen bar configurations may be used. For example, the screen bar may be flat. Alternatively, the screen bar may have a ridge.

Although the invention has been described in terms of exemplary embodiments, it is not limited thereto. Rather, the appended claim should be construed broadly, to include other variants and embodiments of the invention which may be made by those skilled in the art without departing from the scope and range of equivalents of the invention.

What is claimed is:

1. A method for securing a screen to a screen bar segment, comprising the steps of:

(a) providing a screen bar segment having a mounting surface on a face thereof, the segment having adhesive on the mounting surface;

(b) spreading the screen across the mounting surface of the screen bar segment;

(c) melting the adhesive;

(d) pushing the screen with a plurality of pins so the screen contacts the adhesive across a length of the screen bar segment.

2. The method of claim 1, wherein step (c) includes blowing a first gas onto the adhesive with forced convection, the first gas having a temperature greater than a melting point of the adhesive.

3. The method of claim 2, wherein the first gas is air blown onto at least one of the group consisting of the screen bar segment and the adhesive.

4. The method of claim 3, wherein the first gas is air having a temperature of approximately 177° C.

5. The method of claim 2, further comprising: blowing a second gas onto at least one of the group consisting of the screen bar segment and the adhesive after step (d).

6. The method of claim 5, wherein the second gas is air having a temperature which is below a melting temperature of the adhesive.

7. The method of claim 1, further comprising:

(e) allowing the adhesive to cool after step (d); and (f) removing the plurality of pins after step (e).

8. The method of claim 1, further comprising:

applying a release coating to the plurality of pins before step (d).

9. The method of claim 1, wherein successive ones of the plurality of pins are spaced apart from each other by a distance of between about 0.6 centimeters and about 2.5 centimeters.

10. The method of claim 9, wherein the distance between pins is about 1.25 centimeters.

11. The method of claim 1, wherein the mounting surface is a side or a bottom of a groove having a width of about 0.35 centimeter and the pins have a diameter between about 0.15 centimeter and about 0.34 centimeter.

12. The method of claim 11, wherein the diameter of the pins is between about 0.25 centimeter and about 0.3 centimeter.

13. The method of claim 1, wherein the adhesive is one of the group consisting of hot melt adhesives and thermoplastic resins having a heat resistance temperature of at least about 35° C. and a viscosity of at most about 5400 poise at about 200° C.

14. The method of claim 13, wherein the adhesive has a heat resistance temperature between about 55° C. and about 130° C.

15. The method of claim 1, wherein the adhesive is a hot melt adhesive from the group consisting of polyester, polyamide, polyolefin, polypropylene, polyurethane, butyl and ethylene vinyl acetate based adhesives.

16. The method of claim 1, wherein the pins simultaneously push the screen into the adhesive.

17. The method of claim 1, wherein the screen and bar have a break load test value of at least about 13.5 lbs.

18. The method of claim 1, further comprising the step of inserting a tape or film between the pins and the screen, before step (d).

19. The method of claim 1, further comprising the step of heating the frame, before step (c), to a temperature above a melting temperature of the adhesive, and step (c) includes conducting heat from the frame to the adhesive.

20. The method of claim 1, wherein the pins are bayonet pins.

21. The method of claim 1, wherein the pins are tapered.

22. A method for securing a screen to a frame, comprising the steps of:

(a) providing a frame, the frame including a plurality of screen bar segments, each screen bar segment having a mounting surface on a face of the frame;

(b) spreading the screen across the frame so that the screen extends over the mounting surface of each screen bar segment;

(c) securing the screen to the face of the frame with an adhesive at a plurality of positions across a length of the mounting surface of at least one screen bar segment, including supporting the screen on a support surface interior to the frame and substantially in a plane of the mounting surface of each screen bar segment while securing the screen, thereby removing slack from the screen.

23. The method of claim 22, wherein the mounting surface is a tensioning step, the method further comprising the step of pre-tensioning the frame using pre-loading blocks outside of the frame, without using stop blocks inside of the frame.

24. A method for securing a screen to a frame, comprising the steps of:

(a) providing a frame, the frame including a plurality of screen bar segments, each screen bar segment having a mounting surface on a face thereof, each screen bar segment having adhesive on the mounting surface;

(b) spreading screen across the frame such that the screen extends over the mounting surface of each screen bar segment;

(c) melting the adhesive on at least one of the screen bar segments;

(d) inserting the screen with a plurality of pins so the screen contacts the adhesive across a length of the at least one screen bar segment.

25. The method of claim 24, wherein the plurality of pins include a row and a column of pins aligned in an angle-shaped configuration, and step (d) includes inserting the screen into the adhesive on two screen bar segments of the frame, simultaneously.

26. The method of claim 25, further comprising the steps of:

rotating the frame by 180 degrees; and repeating steps (c) and (d) to insert the screen into the adhesive on a third screen bar segment and a fourth screen bar segment of the frame simultaneously.

27. The method of claim 26, wherein the frame has a pre-bowed shape, and step (a) includes:

(a1) mounting the frame on a table; and (a2) distorting the pre-bowed shape of the frame with at least one pre-loading block.

28. The method of claim 27, wherein step (a2) includes straightening the frame.

29. A method for securing an open mesh screen to a frame, comprising the steps of:

(a) providing a frame that includes a plurality of outwardly pre-bowed screen bar segments, each screen bar segment having a mounting surface on a face of the frame;

(b) supporting the pre-bowed screen bar segments of the frame so that the frame has substantially straight sides;

(c) spreading an untensioned open mesh ventilation screen across the frame so that the open mesh screen extends over the mounting surface of each screen bar segment;

(d) applying an adhesive on the mounting surfaces;

(e) inserting a portion of the open mesh screen with an inserting apparatus so that the portion of the open mesh screen contacts the adhesive across a length of each mounting surface, the inserting apparatus contacting the adhesive during the inserting step; and (f) releasing the screen bar segments to remove sag while imparting a sufficiently small amount of tension so as maintain the screen bar in a substantially straight condition, thereby to form a ventilation screen frame assembly.

30. The method of claim 29, wherein step (b) includes:

(b1) mounting the frame on a table; and (b2) changing the pre-bowed shape of the frame with a plurality of pre-loading blocks.

31. The method of claim 29, further comprising, between step (d) and step (e), the step of blowing a first gas directly onto the adhesive, the first gas having a temperature greater than a melting point of the adhesive, thereby to melt the adhesive.

32. The method of claim 31, wherein the first gas is air having a temperature of approximately 177° C.

33. The method of claim 31, further comprising: blowing a second gas directly onto the adhesive, after step (e), the second gas having a temperature below the melting point of the adhesive.

34. The method of claim 33, wherein the second gas is air having a temperature which approximates ambient temperature.

35. The method of claim 29, wherein step (e) includes embedding the open mesh screen in the adhesive.

36. The method of claim 29, wherein the inserting apparatus includes a roller.

37. The method of claim 36, further comprising the step of heating the roller before step (e).

38. The method of claim 29, wherein the inserting apparatus includes a plurality of pins, the method further comprising the step of inserting a tape or film between the pins and the screen, before step (d).

39. The method of claim 29, wherein the screen and frame have a break load test value of at least about 50% greater than a spline-retained screen of like thickness “T” and like Hi tensioning step height “D”.

40. A method for securing an open mesh screen to a frame, comprising the steps of:

(a) providing a frame that includes a plurality of screen bar segments, each screen bar segment having a mounting surface on a face of the frame;

(b) supporting the frame so that the frame has a predetermined camber;

(c) spreading the open mesh screen across the frame so that the open mesh screen extends over the mounting surface of each screen bar segment;

(d) applying an adhesive on at least one mounting surface;

(e) inserting a portion of the open mesh screen into the adhesive on at least two screen bar segments of the frame, simultaneously with an inserting apparatus so that the portion of the open mesh screen contacts the adhesive across a length of the at least one mounting surface, the inserting apparatus contacting the adhesive during the inserting step.

41. A method for securing an open mesh screen to a frame, comprising the steps of:

(a) providing a frame that includes a plurality of screen bar segments, each screen bar segment having a mounting surface on a face of the frame;

(b) supporting the frame so that the frame has a predetermined camber;

(c) spreading the open mesh screen across the frame so that the open mesh screen extends over the mounting surface of each screen bar segment;

(d) applying an adhesive on at least one mounting surface;

(e) inserting a portion of the open mesh screen with an inserting apparatus so that the portion of the open mesh screen contacts the adhesive across a length of the at least one mounting surface, the inserting apparatus contacting the adhesive during the inserting step;

(f) rotating the frame by 180 degrees in a plane of the screen; and (g) repeating steps (c) and (d) to insert the open mesh screen into the adhesive on the mounting surface on a third screen bar segment and a fourth screen bar segment of the frame simultaneously.

42. A method for securing a screen to a frame, comprising the steps of:

(a) providing a frame that includes a plurality of outwardly pre-bowed screen bar segments, each screen bar segment having a mounting surface on a face of the frame;

(b) applying an adhesive on the mounting surfaces;

(c) deforming the pre-bowed screen bar segments of the frame inward elastically towards a center of the frame till the screen bar segments are substantially straight;

(d) spreading untensioned ventilation screen across the frame so that the screen extends over the mounting surface of each screen bar segment;

(e) inserting a portion of the screen with an inserting apparatus so that the portion of the screen contacts the adhesive across a length of each mounting surface;

(f) releasing the screen bar segments to remove sag while imparting a sufficiently small amount of tension so as to maintain the screen bar in a substantially straight condition, thereby to form a ventilation screen assembly.

43. The method of claim 42, wherein step (c) includes pre-tensioning the frame using pre-loading blocks outside of the frame, without using stop blocks inside of the frame.

44. The method of claim 42, wherein step (c) includes applying sufficient pre-stress to remove wrinkles without substantially deforming the screen bar from a straight condition after completion of step (f).

45. The method of claim 42, wherein the mounting surface is a groove or tensioning step and step (e) includes inserting the screen material substantially without friction between the screen material and the mounting surface.

46. A method for securing a screen to a screen bar segment, comprising the steps of:

(a) providing a screen bar segment having a mounting surface on a face thereof;

(b) mounting an adhesive tape to the mounting surface, the adhesive tape having adhesive on both faces thereof, so that the tape has an adhesive surface facing away from the mounting surface of the screen bar segment, including:

attaching a non-adhesive tape or film to a portion of a bottom face of the adhesive tape, along a length thereof, and mounting the tape on the mounting surface of the screen bar segment so that the portion of the tape having the non-adhesive tape attached thereto forms a foldable flap; and (c) spreading the screen across the mounting surface of the screen bar segment, so that the screen contacts the adhesive tape, thereby securing the screen.

47. The method of claim 46, comprising:

(d) folding the flap over the screen, to secure the screen between the flap and a fixed portion of the tape.

48. The method of claim 46, wherein step (b) includes securing a bottom surface of a fixed portion of the tape to the mounting surface of the screen bar segment using a layer of adhesive, so that a remaining portion of the tape forms a foldable flap.

49. The method of claim 48, further comprising:

(d) folding the flap over the screen, to secure the screen between the flap and the fixed portion of the tape.

50. The method of claim 24, wherein said screen and frame when so joined can pass a 37 lb. load test in accordance with break load at a thickness "T" at least about 10% less than the thickness "T" of a passing spline-retained screen and frame of like material undergoing said load test.

51. The method of claim 24, further comprising the step of inserting a tape or film between the pins and the screen, before step (d).

52. The method of claim 24, wherein step (a) includes:

(a1) assembling a plurality of pre-bowed screen bar segments to form the frame.

* * * * *